US012490015B2

(12) United States Patent
Pedersen et al.

(10) Patent No.: US 12,490,015 B2
(45) Date of Patent: Dec. 2, 2025

(54) COMMUNICATION DEVICE FOR A HEARING PROTECTION SYSTEM, A HEARING PROTECTION SYSTEM, AND RELATED METHODS

(71) Applicant: FalCom A/S, Ballerup (DK)

(72) Inventors: Søren Christian V. Pedersen, Valby (DK); Mark Orton, Lomma (SE)

(73) Assignee: FalCom A/S, Ballerup (DK)

( * ) Notice: Subject to any disclaimer, the term of this patent is extended or adjusted under 35 U.S.C. 154(b) by 216 days.

(21) Appl. No.: 18/074,056

(22) Filed: Dec. 2, 2022

(65) Prior Publication Data

US 2023/0188887 A1 Jun. 15, 2023

(30) Foreign Application Priority Data

Dec. 15, 2021 (EP) .................................... 21214642

(51) Int. Cl.
*H04R 1/10* (2006.01)

(52) U.S. Cl.
CPC ....... *H04R 1/1083* (2013.01); *H04R 2420/07* (2013.01)

(58) Field of Classification Search
CPC .......................... H04R 1/1083; H04R 2420/07
See application file for complete search history.

(56) References Cited

U.S. PATENT DOCUMENTS

2016/0205453 A1* 7/2016 Wiese .................... H04R 1/025 381/26
2017/0374447 A1* 12/2017 Baum .................. H04R 1/1025
2020/0336821 A1* 10/2020 Herbert ................ H04R 1/1041
2022/0394385 A1* 12/2022 Kasson .................... H04R 3/12

FOREIGN PATENT DOCUMENTS

EP 3628284 4/2020
WO WO 2009/041873 4/2009
WO WO 2021/171143 9/2021
WO WO-2021221627 A1 * 11/2021 ........... H04R 1/1008

OTHER PUBLICATIONS

Extended European Search Report for EP Patent Appln. No. 21214642.7 dated May 20, 2022.

* cited by examiner

*Primary Examiner* — Andrew Sniezek
(74) *Attorney, Agent, or Firm* — Vista IP Law Group, LLP

(57) ABSTRACT

A communication device for a hearing protection system comprising one or more hearing protection devices. The communication device comprises a processing unit, a memory, and an interface. The interface comprises a first hearing protection device interface comprising a first connector for connection of a hearing protection device. The interface comprises a second hearing protection device interface comprising a second connector for connection of a hearing protection device. The first connector and the second connector are of the same connector type.

30 Claims, 6 Drawing Sheets

COMMUNICATION DEVICE FOR A HEARING PROTECTION SYSTEM, A HEARING PROTECTION SYSTEM, AND RELATED METHODS

RELATED APPLICATION DATA

This application claims priority to, and the benefit of, European Patent Application No. 21214642.7 filed on Dec. 15, 2021. The entire disclosure of the above application is expressly incorporated by reference herein.

FIELD

The present disclosure relates to a communication device for a hearing protection system, a hearing protection system, and related methods including a method for operating a communication device for a hearing protection system.

BACKGROUND

In combat situations or other stressed environments with a high noise level, it is desirable for a user to effectively protect his/her hearing while enabling the user to communicate with teammates via radio or other communication systems. Traditional hearing protection, such as passive foam and/or earmuffs, fail to provide a user with critical audio cues that may enable the user to keep the spatial awareness. During combat situations or other stressed environments, a user may need to wear a hearing protection device to attenuate noise, e.g. from gunfire, machinery and other types of constant or intermittent noise while being able to communicate with teammates.

Modern advanced hearing protection systems provide hear-through capabilities that enable users to hear the environment and to locate and utilize the direction of sound sources. In combat situations, such as in the military domain, there exist situations where a single hearing protection device, such as over-the-ear (OTE) or in-the-ear (ITE) hearing protection devices is not enough. In combat situations or other stressed environments with a high noise level, a user may be exposed to sound pressure levels (SPL) that may require a dual hearing protection system.

SUMMARY

There exists some configurations of hearing protection systems (such as dual hearing protection systems), such as a passive foam in the ear-canal in combination with an active over-the-ear, OTE, hearing protection device. However, the known systems still suffer from many drawbacks, such as too little gain in the hear-through and lack of flexibility.

Accordingly, there is a need for communication devices for a hearing protection systems (such as dual hearing protection systems) and methods which improve the flexibility of hearing protection systems (such as dual hearing protection systems) and the hearing protection of users, e.g., during combat situations or in other stressed environments. There may also be a need to increase the situational awareness of a user of a hearing protection system (such as a dual hearing protection system).

A communication device for a hearing protection system, such as a dual hearing protection system, comprising one or more hearing protection devices. The communication device comprises a processing unit, a memory, and an interface. The interface comprises a first hearing protection device interface comprising a first connector for connection of a hearing protection device. The interface comprises a second hearing protection device interface comprising a second connector for connection of a hearing protection device. Optionally, the first connector and the second connector are of the same connector type. The first connector and/or the second connector may be seen as electrical connectors, such as physical electrical connectors. In other words, the first connector and/or the second connector may be seen as connectors for wired electrical connection, e.g., via the first hearing protection device interface and/or the second hearing protection device interface. Optionally, the first hearing protection device interface and/or the second hearing protection device interface may be embodied as a wireless interface, such as comprising a wireless transceiver. In other words, the communication device may comprise a wireless interface acting as (or instead of) the first hearing protection device interface and/or the second hearing protection device interface. In other words, the first connector and the second connector may be omitted when the communication device comprises a wireless interface acting as the first hearing protection device interface and/or the second hearing protection device interface. In other words, the communication device may be configured to detect one or more hearing protection devices connected to the communication device via the interface, such as via the wireless interface. The communication device may be configured to determine a connection scheme of the interface, such as of the wireless interface. The communication device may be configured to determine a communication scheme between the communication device and the one or more hearing protection devices. The communication device may be configured to communicate with the one or more hearing protection devices according to the connection scheme and/or the communication scheme.

Further, a method for operating a communication device for a hearing protection system, such as a dual hearing protection system, is disclosed. The hearing protection system may comprise one or more hearing protection devices. The communication device comprises a processing unit, a memory, and an interface. The interface comprises a first hearing protection device interface comprising a first connector for connection of a hearing protection device. The interface comprises a second hearing protection device interface comprising a second connector for connection of a hearing protection device. Optionally, the first connector and the second connector are of the same connector type. Optionally, the first hearing protection device interface and/or the second hearing protection device interface may be embodied as a wireless interface, such as comprising a wireless transceiver. In other words, the communication device may comprise a wireless interface acting as (or instead of) the first hearing protection device interface and/or the second hearing protection device interface. In other words, the first connector and the second connector may be omitted when the communication device comprises a wireless interface acting as the first hearing protection device interface and/or the second hearing protection device interface. In other words, the method may comprise detecting one or more hearing protection devices connected to the communication device via the interface, such as via the wireless interface. The method may comprise determining a connection scheme of the interface, such as of the wireless interface. The method comprises detecting a connection scheme of the interface. The method comprises determining a communication scheme between the communication device and one or more of the first hearing protection device interface and the second hearing protection device interface.

The method comprises communicating with the first connector and/or the second connector according to the connection scheme and/or the communication scheme.

Further, a hearing protection system, such as a dual hearing protection system, is disclosed. The hearing protection system comprises at least two hearing protection devices including a first hearing protection device and a second hearing protection device. The hearing protection system comprises a communication device as disclosed herein comprising a processing unit, a memory, and an interface. The interface comprises a first hearing protection device interface comprising a first connector for connection of a hearing protection device. The interface comprises a second hearing protection device interface comprising a second connector for connection of a hearing protection device. Optionally, the first connector and the second connector are of the same connector type. Optionally, the first hearing protection device interface and/or the second hearing protection device interface may be embodied as a wireless interface, such as comprising a wireless transceiver. In other words, the communication device may comprise a wireless interface acting as (or instead of) the first hearing protection device interface and/or the second hearing protection device interface. In other words, the first connector and the second connector may be omitted when the communication device comprises a wireless interface acting as the first hearing protection device interface and/or the second hearing protection device interface. In other words, the communication device may be configured to detect one or more hearing protection devices connected to the communication device via the interface, such as via the wireless interface.

It is an advantage of the present disclosure that the flexibility and versatility of the communication device is increased. For example, the communication device may be adapted to interface and/or communicate with one or more different types of hearing protection devices (such as different hearing protection devices having different configurations, e.g. over-the-ear, OTE, hearing protection devices and/or in-the-ear, ITE, hearing protection devices) in a simple and flexible manner.

Further, it is an advantage that the interface (such as the one or more connectors) of the communication device are provided in simpler manner (such as providing an interface that is more versatile with respect to different hearing protection devices). By having the first connector and the second connector of the same connector type, the communication device may allow the user to connect a hearing protection device of any kind to any of the connectors of the interface of the communication device. A user being in a stressed environment with a high noise level may not have to think about where to connect the one or more hearing protection devices, in turn simplifying the operation of the communication device for the user.

It may be appreciated that an advantage of the present disclosure is that a communication scheme to one or more of the hearing protection device interfaces may be adapted based on a connection scheme of the interface of the communication device.

Further, it is an advantage of the present disclosure that the safety of a user (such as a soldier) is improved. It may be appreciated that a user (such as a soldier) may be able to remove a first hearing protection device (such as an over-the-ear hearing protection device) without losing a functionality of a second hearing protection device (such as an in-the-ear hearing protection device) or vice-versa. For example, a user (such as a soldier) may be able to remove a first hearing protection device (such as an over-the-ear hearing protection device) without having to sacrifice a hear-through function of a second hearing protection device (such as an in-the-ear hearing protection device).

BRIEF DESCRIPTION OF THE DRAWINGS

The above and other features and advantages will become readily apparent to those skilled in the art by the following detailed description of exemplary communication devices, methods, and/or server devices thereof with reference to the attached drawings, in which.

DETAILED DESCRIPTION

Figure 1:
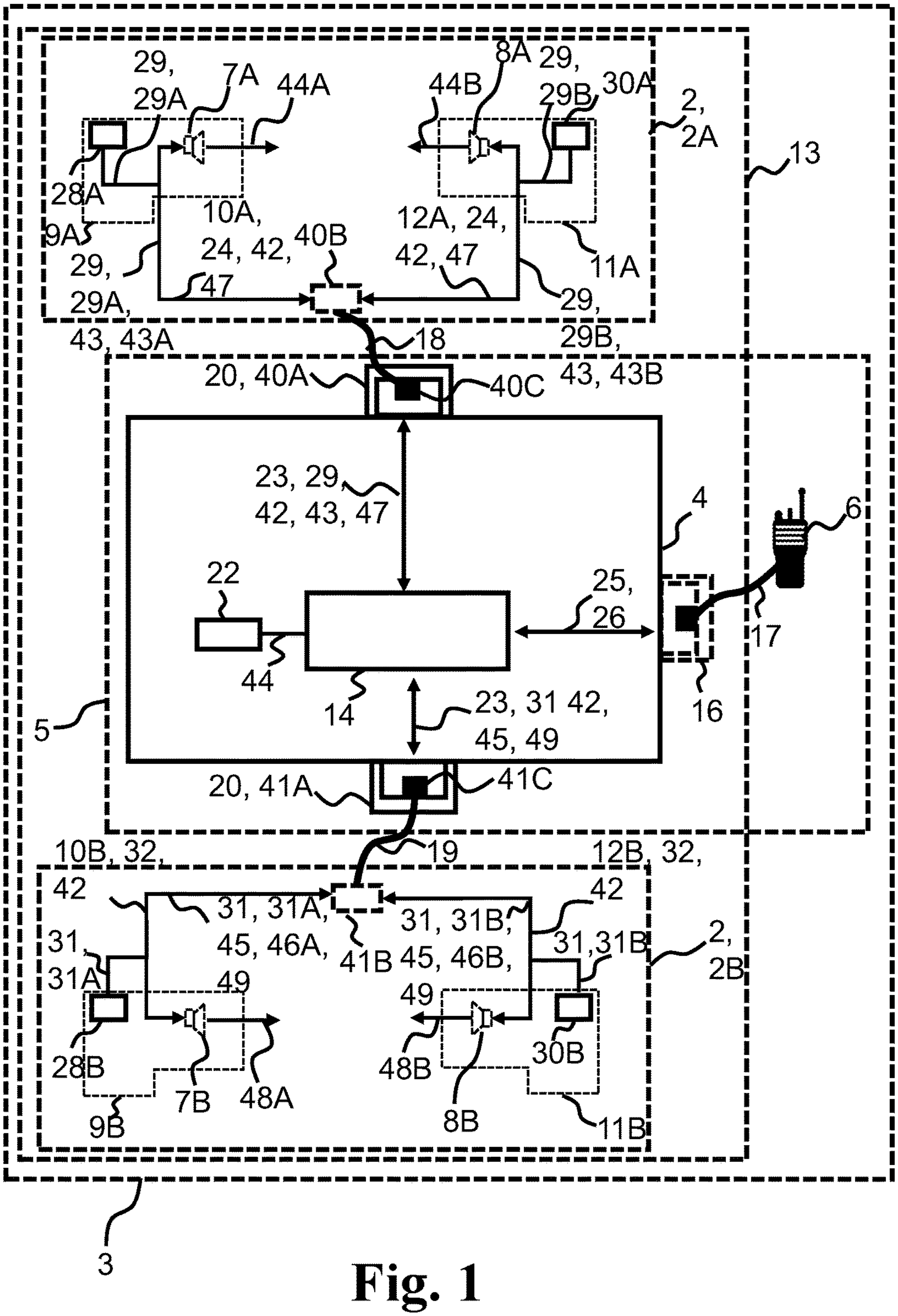
FIG. 1 is a block diagram of an exemplary hearing protection system comprising an exemplary communication device according to the disclosure, FIG. 2 schematically illustrates an exemplary hearing protection system comprising an exemplary communication device according to the disclosure, FIG. 3 schematically illustrates an exemplary hearing protection system comprising an exemplary communication device according to the disclosure, FIG. 4 schematically illustrates an exemplary hearing protection system comprising an exemplary communication device according to the disclosure, FIG. 5 schematically illustrates an exemplary hearing protection system comprising an exemplary communication device according to the disclosure.

Various exemplary communication devices and/or methods and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the communication devices, and/or methods. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other communication devices and/or methods even if not so illustrated, or if not so explicitly described.

A communication device for a hearing protection system, such as a dual hearing protection system, comprising one or more hearing protection devices is disclosed. The communication device comprises a processing unit, a memory, and an interface. Optionally, the communication device comprises a radio interface for communicating with a radio unit. In other words, the communication device may comprise a radio connector. The interface comprises a first hearing protection device interface comprising a first connector, such as first electrical connector, for connection of a hearing protection device, such as a first hearing protection device. It may be appreciated that the communication device is configured to act as an interface between one or more hearing protection devices and one or more radio units. In other words, the communication device may be seen as a device for connecting one or more hearing protection devices and one or more radio units. For example, the communication device may be configured to handle communication between one or more hearing protection devices and one or more radio units, such as for handling radio input signals, radio output signals, hearing protection device input signals, and hearing protection device output signals.

The radio interface may comprise a digital radio interface and/or an analogue radio interface. The radio interface may comprise a first radio interface and/or a second radio interface. The radio interface, such as the first radio interface and/or the second radio interface may comprise a wired interface. Thus, the radio interface may comprise one or more radio connectors, such as a first radio connector (first radio interface) and optionally a second radio connector (second radio interface), each radio connector comprising terminals for wired connection to a radio unit. In other words, the communication device may be configured to communicate with radio unit(s) via the first radio interface and/or the second radio interface, such as via the digital radio interface (such as by using a universal serial bus, USB, port and/or an ethernet port). The first radio connector and/or the second radio connector may be seen as electrical connectors, such as physical electrical connectors. In other words, the first radio connector and/or the second radio connector may be seen as connectors for wired electrical connection, e.g., via the radio interface, such as via the first radio interface and/or the second radio interface.

The interface comprises a second hearing protection device interface comprising a second connector, such as second electrical connector, for connection of a hearing protection device, such as a second hearing protection device. The first connector and the second connector are of the same connector type. Optionally, the first hearing protection device interface and/or the second hearing protection device interface may be embodied as a wireless interface, such as comprising a wireless transceiver. In other words, the communication device may comprise a wireless interface acting as the first hearing protection device interface and/or the second hearing protection device interface. In other words, the first connector and the second connector may be omitted when the communication device comprises a wireless interface acting as the first hearing protection device interface and/or the second hearing protection device interface. In other words, the communication device may be configured to detect one or more hearing protection devices connected to the communication device via the interface, such as via the wireless interface. The communication device may be configured to determine a connection scheme of the interface, such as a connection scheme of the wireless interface. The communication device may be configured to determine a communication scheme between the communication device and the one or more hearing protection devices. The communication device may be configured to communicate with the one or more hearing protection devices according to the connection scheme and/or the communication scheme.

The first connector and the second connector are of the same connector type. In other words, the same connector type may be seen as the first connector and the second connector may be configured to connect and/or receive the same type of connector from a hearing protection device and/or an accessory device. For example, the first connector and the second connector may comprise the same number of terminals, the same number of ports, have the same shape, have the same locking mechanism, and/or have the same connector technology. In other words, the first connector and the second connector may be seen as being agnostic, such as being agnostic ports. A connector may be seen as a connector for mechanically connecting a connector and/or a plug of a hearing protection device to the communication device. The first connector and the second connector may for example be males connectors or female connectors. For example, when a connector of a hearing protection device is a male connector, the first connector and/or the second connector may be female connectors. The first connector may be associated with a first channel, such as a first communication channel. The second connector may be associated with a second channel, such as a second communication channel.

A hearing protection device interface, such as the first hearing protection device interface and/or the second hearing protection device interface, may allow the connection of the communication device to one or more hearing protection devices of a hearing protection system and/or hearing protection apparatus of a user. In other words, the communication device may be configured to obtain an input or at least a part thereof from the one or more hearing protection devices via the first hearing protection device interface and/or the second hearing protection device interface. The interface may comprise wireless or wired interfaces. In one or more exemplary communication devices, the first hearing protection device interface, the second hearing protection device interface, and/or the radio interface may comprise wireless or wired interfaces. A hearing protection device interface as disclosed herein, such as the first hearing protection device interface and/or the second hearing protection device interface, may comprise a hearing protection device connector, such as the first connector and/or the second connector, for wired connection between the communication device and the one or more hearing protection devices.

In one or more exemplary communication devices, the interface comprises a wireless interface, and wherein the communication device is configured to communicate with a hearing protection device via the wireless interface.

In one or more exemplary communication devices, the processing unit is configured to obtain, such as using the processing unit and/or the interface, an input from a hearing protection device, such as a first hearing protection device and/or a second hearing protection device via the interface, such as via the first hearing protection device interface and/or the second hearing protection device interface. In one or more exemplary communication devices, the processing unit is configured to transmit a first output to a hearing protection device, such as a first hearing protection device and/or a second hearing protection device, via the interface, such as via the first hearing protection device interface and/or the second hearing protection device interface.

The input may comprise one or more inputs, such as one or more microphone inputs from one or more microphones of a hearing protection device. The input may comprise a first input from a first hearing protection device and/or a second input from a second hearing protection device. The input may comprise a voice input from a voice microphone, such as a boom microphone and/or an ear canal microphone, of a hearing protection device. The first input may comprise a first primary input from a first microphone of the first hearing protection device. The first input may comprise a first secondary input from a second microphone of the first hearing protection device. The second input may comprise a second primary input from a first microphone of the second hearing protection device. The second input may comprise a second secondary input from a second microphone of the second hearing protection device.

In one or more exemplary communication devices, the communication device is configured to detect, such as using the processing unit and/or the interface, a connection scheme of the interface. In other words, the communication device may be configured to detect a connection of one or more hearing protection devices and/or accessory devices to one or more of the first connector and the second connector. Formulated differently, a connection scheme may indicate a connection of one or more hearing protection devices and/or accessory devices to one or more of the first connector and the second connector. For example, the communication device may be configured to detect a number of hearing protection devices and/or accessory devices connected to the interface, such as connected to the first connector and the second connector. Formulated differently, a connection scheme may indicate a number of hearing protection devices and/or accessory devices connected to the interface, such as connected to the first connector and the second connector. Optionally, the communication device may be configured to detect a number of hearing protection devices and/or accessory devices connected to the wireless interface. Formulated differently, a connection scheme may indicate a number of hearing protection devices and/or accessory devices connected to the wireless interface.

An accessory device as disclosed herein may be seen as an accessory electronic device. An accessory device as disclosed herein may comprise one or more of: a splitter (such as splitter part), a wireless transceiver, a radio device, and a user electronic device (such as a user electronic device for end-user device, EUD, applications).

A splitter as disclosed herein may be seen as a splitter configured to be connected to a hearing protection device interface of the communication device (such as a connector of the communication device) for providing one or more additional hearing protection device interfaces to the communication device, such as for providing one or more additional connectors to the communication device.

In one or more exemplary communication devices, the communication device may be seen as a two-part communication device. In other words, the communication device may comprise a main part and a splitter part connected to a hearing protection device interface of the communication device, such as connected to a connector of the main part. In other words, the main part may comprise one connector, and the splitter part may comprise a first splitter connector on one side configured to be connected to a connector of the main part and two or more connectors, such as a second splitter connector and a third splitter connector, on the other side configured to be connected to one or more hearing protection devices.

In one or more exemplary communication devices, the communication device is configured to determine, such as using the processing unit and/or the interface, a communication scheme between the communication device and one or more of the first hearing protection device interface and the second hearing protection device interface based on the connection scheme. In other words, the communication device may be configured to determine a communication scheme between the communication device and one or more of the first hearing protection device interface and the second hearing protection device interface based on one or more hearing protection devices connected to the communication device.

In one or more exemplary communication devices, to determine, such as using the processing unit and/or the interface, a communication scheme comprises to determine an output scheme comprising a first output to one or more first output terminals of the first connector and/or a second output to one or more second output terminals of the second connector. In other words, the processing unit may be configured to transmit, such as using the processing unit and/or the interface, the first output to the hearing protection device connected to the first connector via the interface, such as via the first hearing protection device interface. In other words, the processing unit is configured to transmit, such as using the processing unit and/or the interface, the second output to the hearing protection device connected to the second connector via the interface, such as via the second hearing protection device interface.

In one or more exemplary communication devices, the communication device is configured to select a first output scheme and determine the first output based on the hearing protection device connected to the first hearing protection device interface, such as connected to the first connector and/or based on the hearing protection device connected to the second hearing protection device interface, such as connected to the second connector.

In one or more exemplary communication devices, the communication device is configured to select a second output scheme and determine the second output based on the hearing protection device connected to the first hearing protection device interface, such as connected to the first connector and/or based on the hearing protection device connected to the second hearing protection device interface, such as connected to the second connector.

In one or more exemplary communication devices, the output scheme, such as the first output scheme and/or the second output scheme, may be indicative of a prioritization of which of the one or more first output terminals and/or the one or more second output terminals the communication device should output the first output and/or the second output to. In other words, to determine the output scheme may comprise to determine which of the one or more hearing protection devices are active and/or inactive, such as active and/or inactive for communication and/or active and/or inactive for a hearing protection function of a user.

In one or more exemplary communication devices, to determine a communication scheme comprises to determine an input scheme comprising a first input to one or more first input terminals of the first connector and/or a second input to one or more second input terminals of the second connector. In other words, the processing unit may be configured to transmit and/or receive, such as using the processing unit and/or the interface, the first input to and/or from the hearing protection device connected to the first connector via the interface, such as via the first hearing protection device interface. In other words, the processing unit is configured to transmit and/or receive, such as using the processing unit and/or the interface, the second input to and/or from the hearing protection device connected to the second connector via the interface, such as via the second hearing protection device interface. To obtain an input from a hearing protection device may comprise to receive an input from a hearing protection device. The first input may be received from one or more microphones of the hearing protection device. In other words, the first input may comprise a first microphone input signal (also denoted first primary input) and/or a second microphone input signal (also denoted first secondary input) from respective first microphone and second microphone. For example, the first input may comprise 2, 3, 4, 5, 10 microphone input signals from respectively 2, 3, 4, 5, 10 different microphones of the hearing protection device.

The first input may be representative of one or more of a sound e.g. a voice of the user wearing the hearing protection device, the sound from a vehicle, a weapon, or a teammate, a direction e.g. the direction from where a sound comes from and/or of where a position of interest is (e.g. an enemy territory), a distance to a sound or a position of interest, and/or a relative direction such as an angle indicating a range or radius of where a sound comes from or of where a position of interest is.

In one or more exemplary communication devices, the processing unit comprises an input module for determining an input signal based on the communication scheme and/or the connection scheme. In other words, the processing unit may be configured to mix one or more signals (such as audio signals) from one or more hearing protection devices, such as from one or more microphones of the one or more hearing protection devices, based on the communication scheme. The processing unit may be configured to mix one or more signals from the first hearing protection device and/or from the second hearing protection device based on the communication scheme and/or the connection scheme. The input signal may be determined based on the connection scheme and/or the communication scheme.

In one or more exemplary communication devices, the processing unit comprises an output module for determining an output signal based on the communication scheme and/or the connection scheme. In other words, the processing unit may be configured to mix one or more signals (such as audio signals) to the one or more hearing protection devices, such as to one or more receivers of the one or more hearing protection devices, based on the communication scheme and/or the connection scheme. The processing unit may be configured to mix one or more signals to the first hearing protection device and/or to the second hearing protection device based on the communication scheme and/or the connection scheme. The output signal may be determined based on the connection scheme and/or the communication scheme.

The first output may comprise one or more outputs, such as one or more first output signals, for example one or more first audio output signals to one or more receivers of a hearing protection device (such as the hearing protection device worn by the user), where the receivers may output one or more first audio outputs.

The first output may be based on the first input. In other words, the first output may comprise audio picked up by microphones of the user, e.g. to allow the user to hear audio from the surroundings. This may also be referred to as hear-through processing.

The first output may be based on the second input. In other words, audio received by the radio unit connected to the communication unit is presented to the user.

The first output may be representative of one or more of a sound e.g. one or more voices from one or more other hearing protection devices such as from one or more other users wearing the one or more other hearing protection devices, a distance to a sound or a position of interest, and/or a relative direction such as an angle indicating a range or radius of where a sound comes from or of where a position of interest is.

In one or more exemplary communication devices, the processing unit is configured to output the first output (such as output one or more audio output signals) via the interface, such as the first hearing protection device interface and/or the second hearing protection device interface. Thus, it is to be understood that to transmit the first output may comprise to output the first output. To output the first output via a hearing protection device interface may comprise to output the first output (such as output one or more audio output signals) to a hearing protection device, e.g. to a first receiver of a hearing protection device and/or to a second receiver of the hearing protection device. To output the first output may comprise outputting a first primary output (first primary output signal) to a first receiver and/or to output a first secondary output (first secondary output signal) to a second receiver of the first hearing protection device, e.g. via respective first primary and first secondary output terminals of the interface, such as of the first connector. To output the second output may comprise outputting a second primary output (second primary output signal) to a first receiver and/or to output a second secondary output (second secondary output signal) to a second receiver of the second hearing protection device, e.g. via respective second primary and second secondary output terminals of the interface, such as of the second connector. Thus, the first output may comprise a first primary output and a first secondary output and/or the second output may comprise a second primary output and a second secondary output. The first primary output may be different from the first secondary output and/or the second primary output may be different from the second secondary output. Outputting different output or output signals to first and second receivers of a hearing protection device provides that the communication device can tailor spatial perception (e.g. directionality) of the audio that is output to the user, e.g., based on the connection scheme and/or the connection scheme. In particular, two different audio signals, e.g. audio from a group and audio from one person, can be tailored to be perceived as coming from two different directions, thereby improving the user's ability to separate the audio.

The first receiver may be a left receiver and the second receiver may be a right receiver, such that the first output may be output to the right and/or the left receiver, e.g. at different amplitudes, level difference, frequency difference, phase shifts, and/or time delay.

In one or more exemplary communication devices, the communication device is configured to detect a connection of a hearing protection device to the first connector. In other words, the communication device is configured to detect a connection of a hearing protection device, such as a first hearing protection device and/or a second hearing protection device, by the user of the communication device to the first connector.

In one or more exemplary communication devices, the communication scheme is based on a detection of the connection of the hearing protection device to the first connector. In other words, the connection scheme may indicate that a hearing protection device is connected to the first connector and the communication scheme may be based on the connection scheme.

In one or more exemplary communication devices, the communication device is configured to detect a connection of a hearing protection device to the second connector. In other words, the communication device is configured to detect a connection of a hearing protection device, such as a first hearing protection device and/or a second hearing protection device, by the user of the communication device to the second connector.

In one or more exemplary communication devices, the communication scheme is based on a detection of the connection of the hearing protection device to the second connector. In other words, the connection scheme may indicate that a hearing protection device is connected to the second connector and the communication scheme may be based on the connection scheme.

In one or more exemplary communication devices, the communication device is configured to detect a first type of the hearing protection device connected to the first connector and/or the second connector.

In one or more exemplary communication devices, the communication scheme is based on the first type.

In one or more exemplary communication devices, the communication device is configured to detect a second type of the hearing protection device connected to the second connector and/or the first connector.

In one or more exemplary communication devices, the communication scheme is based on the second type.

A type, such as the first type and/or the second type, may be seen as a type of hearing protection device. For example, a type of hearing protection device may comprise one or more of: an over-the-ear, OTE, hearing protection device, an in-the-ear, ITE, hearing protection device, and an on-the-ear hearing protection device.

In other words, when a type of hearing protection device is detected, the communication device may be configured to determine the communication scheme according to the type of hearing protection device. For example, when the first type is an over-the-ear, OTE, hearing protection device, the communication device may be configured to determine the communication scheme according to an OTE hearing protection device being connected to the first connector and/or the second connector. For example, when the second type is an in-the-ear, ITE, hearing protection device, the communication device may be configured to determine the communication scheme according to an ITE hearing protection device being connected to the second connector and/or the first connector.

In one or more exemplary communication devices, the communication device is configured to detect a connection with an over-the-ear, OTE, hearing protection device.

In one or more exemplary communication devices, the communication scheme is based on the detection of the connection with the over-the-ear hearing protection device. In other words, the communication device may be configured to determine an over-the-ear communication scheme.

In one or more exemplary communication devices, the communication device is configured to detect a connection of an in-the-ear hearing protection device.

In one or more exemplary communication devices, the communication scheme is based on the detection of the connection with the in-the-ear hearing protection device. In other words, the communication device may be configured to determine an in-the-ear communication scheme.

In one or more exemplary communication devices, the communication device may upon detection of a first hearing protection device and a second hearing protection device, such as the detection of an OTE hearing protection device and an ITE hearing protection device, be configured to determine a dual hearing protection device communication scheme, such as a dual hearing protection device configuration.

In one or more exemplary communication devices, the communication device may be configured to detect a first type of hearing protection device connected to the first connector and a second type of hearing protection device connected to the second connector. In one or more exemplary communication devices, the communication scheme is based on the first type and/or the second type. For example, a user of the communication device may wear an OTE hearing protection device and an ITE hearing protection device covered by the OTE hearing protection device. In other words, a user of the communication device may have connected both an OTE hearing protection device and an ITE hearing protection device covered by the OTE hearing protection device to the communication device. For example, when a user of the communication device is wearing an OTE hearing protection device and an ITE hearing protection device covered by the OTE hearing protection device, an output signal (such as an output scheme) may be determined to be an ITE hearing protection device output signal transmitted to one or more receivers of the ITE hearing protection device. The output signal (such as output scheme) may be transmitted via the one or more first output terminals of the first connector and/or the one or more second output terminals of the second connector, e.g., depending on where the ITE hearing protection device is connected.

For example, when a user of the communication device is wearing an OTE hearing protection device and an ITE hearing protection device covered by the OTE hearing protection device, an input signal (such as an input scheme) may be determined to be an OTE hearing protection device input signal received from one or more microphones of the OTE hearing protection device. The input signal (such as input scheme) may be received via the one or more first input terminals of the first connector and/or the one or more second input terminals of the second connector, e.g., depending on where the OTE hearing protection device is connected.

In other words, and an input signal may be based on an input from one or more microphones of the OTE hearing protection device.

It may be appreciated that when a type of hearing protection device is not detected, the communication device is configured to determine the communication scheme accordingly. In other words, when a type of hearing protection device is not detected, the communication device is configured to transmit (such as output) and/or determine the same signal, such as the same input signal and/or output signal, e.g., audio signal, to and/or from the one or more hearing protection devices.

In one or more exemplary communication devices, the detection of a connection scheme comprises to detect an active or inactive state of the hearing protection device connected to the first connector. In one or more exemplary communication devices, the communication scheme is based on a state, such as an active or inactive state, of the hearing protection device connected to the first connector.

In one or more exemplary communication devices, the detection of a connection scheme comprises to detect an active or inactive state of the hearing protection device connected to the second connector. the communication scheme is based on a state, such as an active or inactive state, of the hearing protection device connected to the second connector.

It may be appreciated that the communication device is configured to detect an active or inactive state of at least part of the hearing protection device. For example, when a hearing protection device is taken off by a user of the hearing protection system, the hearing protection device may still be connected to a connector of the communication device but may be detected as inactive since the user has taken the hearing protection device off (e.g., the user is not protected by the hearing protection device when it's taken off). In one or more exemplary communication devices, the communication device may be configured to detect that a hearing protection device, such as the first hearing protection device and/or second hearing protection device, is not worn properly by a user of the hearing protection system. For example, the communication device may be configured to detect that only one ear protector of a hearing protection device is properly worn by a user. In one or more exemplary communication devices, when two hearing protection devices are connected to the communication device, such as the first hearing protection device and the second hearing protection device, the communication device may be configured to detect that one of the hearing protection devices is not worn properly and/or not worn at all by a user.

For example, a user of the communication device may wear an OTE hearing protection device and an ITE hearing protection device covered by the OTE hearing protection device. In other words, a user of the communication device may have connected both an OTE hearing protection device and an ITE hearing protection device covered by the OTE hearing protection device to the communication device. The communication device may be configured to detect an active or inactive state of the OTE hearing protection device and/or the ITE hearing protection device. For example, an OTE hearing protection device and an ITE hearing protection device may be connected to the communication device, but the communication device may detect that the OTE hearing protection device and/or the ITE hearing protection device are active or inactive. For example, when both an OTE hearing protection device and an ITE hearing protection device are connected to the communication device it may be important that the communication device detects when a hearing protection device is not worn properly or not worn at all by a user, e.g., being detected as inactive. Otherwise, the communication device may detect the OTE hearing protection device and/or the ITE hearing protection device as active, but in reality, one of the hearing protection devices may not be protecting the user. For example, a user may take off the OTE hearing protection device but keep the ITE hearing protection device on. In that situation, the communication device may be configured to detect that the OTE hearing protection device is inactive based on an input (such as audio input) from one or more microphones of the OTE hearing protection device and/or the ITE hearing protection device. It may be advantageous that the communication device is configured to detect an active and/or inactive state of a hearing protection device in order to increase the safety of a user, such as the audio safety of a user. In other words, the communication device may safeguard the audio protection of the user. Furthermore, it may be appreciated that a user (such as a soldier) may be able to remove a first hearing protection device (such as an over-the-ear hearing protection device) without losing a functionality of a second hearing protection device (such as an in-the-ear hearing protection device) or vice-versa. For example, a user (such as a soldier) may be able to remove a first hearing protection device (such as an over-the-ear hearing protection device) without having to sacrifice a hear-through function of a second hearing protection device (such as an in-the-ear hearing protection device).

For example, when the communication device detects that the OTE hearing protection device is inactive, the communication device may be configured to provide a hear-through function via the ITE hearing protection device. The user may alternatively or additionally press an activation button (such as an activation button on the communication or an activation button on an accessory device connected to the communication device) to set a state of a hearing protection device. For example, in a situation where both an ITE hearing protection device and an OTE hearing protection device are connected to the communication device but the OTE hearing protection device is not worn, the user may press a button to set a state of the OTE hearing protection device to be inactive and only utilize the ITE hearing protection device. In other words, the communication device may determine a communication scheme for the ITE hearing protection device.

In one or more exemplary communication devices, to determine the communication scheme based on a state of the hearing protection device connected to a connector may comprise to determine a gain of an input and/or output of the hearing protection device. In other words, to determine the communication scheme based on a state of the hearing protection device connected to a connector may comprise to determine a gain of an input and/or output of the OTE hearing protection device and/or the ITE hearing protection device. For example, when the communication device detects that the ITE hearing protection device is inactive and the OTE hearing protection device is active, the gain of an output signal to the OTE hearing protection device may be reduced.

It may be appreciated that when two hearing protection devices (such as a dual hearing protection system), such as the first hearing protection device and the second hearing protection device, are connected to the communication device, and one of the hearing protection devices is detected as inactive and the remaining one is detected as active, the communication device may be configured to determine the communication scheme as being a communication scheme for a single hearing protection device, such as a single hearing protection system.

In one or more exemplary communication devices, when the communication device detects that a connected hearing protection device is inactive and another one is active, the communication device may be configured to determine an output signal (such as an output scheme) based on the active hearing protection device. In other words, the communication device may be configured to transmit an output signal to one or more receivers of the active hearing protection device. The output signal (such as output scheme) may be transmitted via the one or more first output terminals of the first connector and/or the one or more second output terminals of the second connector, e.g., depending on where the active hearing protection device is connected.

In one or more exemplary communication devices, when the communication device detects that a connected hearing protection device is inactive and another one is active, the communication device may be configured to determine an input signal (such as an input scheme) based on the active hearing protection device. In other words, the communication device may be configured to determine an input signal based on inputs from one or more microphones of the active hearing protection device. The input signal (such as input scheme) may be received via the one or more first input terminals of the first connector and/or the one or more second input terminals of the second connector, e.g., depending on where the active hearing protection device is connected.

An active state may be seen as a state where a hearing protection device is worn correctly by a user of the communication device and/or the hearing protection system. For example, an active state may be seen as a state where a hearing protection device is substantially fully functional for performing a hearing protection task on a user.

An inactive state may be seen as a state where a hearing protection device is not worn properly (such as not fitted properly on or in the ear) or not worn at all by a user of the hearing protection system. For example, an inactive state may be seen as a state where a hearing protection device is not fully functional for performing a hearing protection task on a user.

In one or more exemplary communication devices, the interface comprises a first push-to-talk interface, PTT_1, and/or a second push-to-talk interface PTT_2.

A push-to-talk interface may comprise one or more buttons, such as one or more push-to-talk buttons. A push-to-talk interface may comprise one or more push-to-talk connectors and/or a wireless push-to talk interface, e.g. for wired or wireless connection to one or more remote push-to-talk buttons. The user of the hearing protection system may operate and/or activate the push-to-talk interfaces of the communication device for example to communicate with other users on the same network. The user of the hearing protection system may operate and/or activate the push-to-talk interfaces of the communication device for example to transmit an output from one or more radio units connected to the radio interface (e.g. to other radio unit(s), such as other radio unit(s) of other user(s), such as other users of a group of users on the same network, for example users of one or more talk-groups, such as via a MANET network). In one or more exemplary communication devices, the PTT_1 may be used by a user to communicate using the first hearing protection device, such as to communicate using one or more microphones of the first hearing protection device. In other words, the PTT_1 may be used to transmit and/or receive an output, such as a first output, and/or an input, such as a first input, to and/or from a hearing protection device.

In one or more exemplary communication devices, the PTT_2 may be used by a user to communicate using the second hearing protection device, such as to communicate using one or more microphones of the second hearing protection device. In other words, the PTT_2 may be used to transmit and/or receive an output, such as a second output, and/or an input, such as a second input, to and/or from a hearing protection device.

The one or more push-to-talk buttons may be positioned on a housing of the communication device and/or a housing of the radio unit. The one or more push-to-talk buttons and/or push-to-talk key controls may be wired or wirelessly connected to the push-to-talk interface.

In one or more embodiments, one or more push-to-talk buttons and/or push-to-talk key controls may be positioned remotely from the communication device, for example located at different positions of the user (such as the torso, the arms, the legs, and/or the head of the user) and/or on one or more equipment of the user (such as one or more elements of the hearing protection system, a weapon, a helmet, a vest of the user). This may allow for a simpler and more efficient operation and/or activation of the one or more push-to-talk interfaces for the user (for example by having a push-to-talk buttons and/or push-to-talk key controls at a location that is fast and easy for the user to access).

A method for operating a communication device of a hearing protection system comprising one or more hearing protection devices, the communication device comprising a processing unit, a memory, and an interface comprising a first hearing protection device interface comprising a first connector for connection of a hearing protection device and a second hearing protection device interface comprising a second connector for connection of a hearing protection device, wherein the first connector and the second connector are of the same connector type. The method comprises detecting a connection scheme of the interface. The method comprises determining a communication scheme between the communication device and one or more of the first hearing protection device interface and the second hearing protection device interface based on the connection scheme. The method comprises communicating with the first connector and/or the second connector according to the communication scheme.

It is to be understood that a description of a feature in relation to communication device(s) is also applicable to the corresponding method(s) and/or hearing protection system(s) and vice versa.

FIG. 1 shows an exemplary hearing protection system 3 comprising an exemplary communication device 4 according to the disclosure, a hearing protection device 2, and a radio unit 6. In one or more exemplary hearing protection systems 3, the hearing protection system 3 comprises a first hearing protection device 2A and a second hearing protection device 2B. The hearing protection system 3 may be seen as a dual hearing protection system. In one or more exemplary hearing protection systems 3, the first hearing protection device 2A may comprise an over-the-ear, OTE, hearing protection device, and the second hearing protection device 2B comprises an in-the-ear, ITE, hearing protection device. The communication device 4 comprises a processing unit 14, a memory 22, and an interface 20. Optionally, the communication device 4 comprises a radio interface 16. The interface 20 comprises a first hearing protection device interface 40A comprising a first connector 40C, and a second hearing protection device interface 41A comprising a second connector 41C. The radio interface 16 may comprise a wired interface. In one or more embodiments, the first hearing protection device 2A comprises a first communication device interface 40B, such as comprising a communication device connector configured to be connected to a connector (such as connected to any of the first connector 40C and/or the second connector 41C) of the communication device 4. In one or more embodiments, the second hearing protection device 2B comprises a second communication device interface 41B, such as comprising a communication device connector configured to be connected to a connector (such as connected to any of the first connector 40C and/or the second connector 41C) of the communication device 4.

The first hearing protection device interface 40A may be configured to connect the communication device 4 with the first hearing protection device 2A via a first cable 18, such as one or more multi conductor cables. The number of conductors in the first cable 18 may correspond to the number of terminals of the first hearing protection device interface 40A (such as of the first connector 40C). The first hearing protection device interface 40A may be configured to connect the communication device 4 with the second hearing protection device 2B via a second cable 19, such as one or more multi conductor cables. The number of conductors in the second cable 19 may correspond to the number of terminals of the second hearing protection device interface 41A (such as of the second connector 41C).

The radio interface 16 may allow the connection of the communication device 4 to the radio unit 6 of a hearing protection system 3 or a communication system 5 of the user. The radio interface 16 may be configured to connect the communication device 4 with the radio unit 6 via a cable 17, such as one or more multi conductor cables. The number of conductors in the cables may correspond to the number of terminals of the digital radio interface (such as 4 conductor cable when the digital radio interface comprises 4 terminals). The cable 17 may comprise one or more twisted pairs of conductors.

The first connector 40C and the second connector 41C are of the same connector type. Optionally, the first hearing protection device interface 40A and/or the second hearing protection device interface 41A may be embodied as a wireless interface, such as comprising a wireless transceiver. In other words, the communication device 4 may comprise a wireless interface acting as the first hearing protection device interface 40A and/or the second hearing protection device interface 41A. In other words, the first connector 40C and the second connector 41C may be omitted when the communication device 4 comprises a wireless interface acting as the first hearing protection device interface 40A and/or the second hearing protection device interface 41A. In other words, the communication device 4 may be configured to detect one or more hearing protection devices connected to the communication device 4 via the interface 20, such as via the wireless interface. The communication device 4 may be configured to determine a connection scheme of the interface 20, such as a connection scheme of the wireless interface. The communication device 4 may be configured to determine a communication scheme between the communication device 4 and the one or more hearing protection devices. The communication device 4 may be configured to communicate with the one or more hearing protection devices according to the connection scheme and/or the communication scheme.

The first connector 40C and the second connector 41C are of the same connector type. In other words, the same connector type may be seen as the first connector 40C and the second connector 41C may be configured to connect and/or receive the same type of connector from a hearing protection device and/or an accessory device. For example, the first connector 40C and the second connector 41C may comprise the same number of terminals, the same number of ports, have the same shape, have the same locking mechanism, and/or have the same connector technology. In other words, the first connector 40C and the second connector 41C may be seen as being agnostic, such as being agnostic ports.

A hearing protection device interface, such as the first hearing protection device interface 40A and/or the second hearing protection device interface 41A, may allow the connection of the communication device 4 to one or more hearing protection devices 2, 2A, 2B of a hearing protection system 3 and/or a hearing protection apparatus 13 of a user. In other words, the communication device 4 may be configured to obtain an input 23 or at least a part thereof from the one or more hearing protection devices via the first hearing protection device interface 40A and/or the second hearing protection device interface 41A. The interface 20 may comprise wireless or wired interfaces. A hearing protection device interface as disclosed herein, such as the first hearing protection device interface 40A and/or the second hearing protection device interface 41A, may comprise a hearing protection device connector, such as the first connector 40C and/or the second connector 41C, for wired connection between the communication device 4 and the one or more hearing protection devices.

In one or more exemplary communication devices, the processing unit 14 is configured to obtain, such as using the processing unit 14, an input 23 from a hearing protection device, such as a first hearing protection device 2A and/or a second hearing protection device 2B via the interface 20, such as via the first hearing protection device interface 40A and/or the second hearing protection device interface 41A. In one or more exemplary communication devices, the processing unit 14 is configured to transmit an output 42 to a hearing protection device, such as a first hearing protection device 2A and/or a second hearing protection device 2B, via the interface 20, such as via the first hearing protection device interface 40A and/or the second hearing protection device interface 41A.

The input 23 may comprise one or more inputs, such as one or more microphone inputs from one or more microphones of a hearing protection device. The input 23 may comprise a first input 29 from the first hearing protection device 2A and/or a second input 30 from a second hearing protection device 2B. The input 23 may comprise a voice input from a voice microphone, such as a boom microphone and/or an ear canal microphone, of a hearing protection device. The first input 29 may comprise a first primary input 29A from a first microphone 28A of the first hearing protection device 2A. The first input 29 may comprise a first secondary input 29B from a second microphone 30A of the first hearing protection device 2A. The second input 31 may comprise a second primary input 31A from a first microphone 28B of the second hearing protection device 2B. The second input 31 may comprise a second secondary input 31B from a second microphone 30B of the second hearing protection device 2B.

In one or more exemplary communication devices, the communication device 4 is configured to detect, such as using the processing unit 14 and/or via the interface 20, a connection scheme of the interface 20. In other words, the communication device 4 may be configured to detect a connection of one or more hearing protection devices, such as 2A, 2B, and/or accessory devices (not shown) to one or more of the first connector 40C and the second connector 41C. For example, the communication device 4 may be configured to detect a number of hearing protection devices, such as 2A, 2B, and/or accessory devices connected to the interface 20, such as connected to the first connector 40C and the second connector 41C. Optionally, the communication device 4 may be configured to detect a number of hearing protection devices and/or accessory devices connected to the wireless interface.

The interface 20, such as the first hearing protection device interface 40A and/or the second hearing protection device interface 41A, may allow the connection of the communication device 4 to the hearing protection device 2 of the hearing protection apparatus 13 of the user, e.g. such that the input 23 is obtained from a hearing protection device, such as the first hearing protection device 2A and/or the second hearing protection device 2B, through (or partly through) a first input signal 24. The processing unit 14 may be configured to obtain the input 23 from a hearing protection device 2A and/or 2B, and/or transmit the first output 42 to a hearing protection device, such as to the first hearing protection device 2A via the first hearing protection device interface 40A and/or to the second hearing protection device 2B via the second hearing protection device interface 41A.

The output 42 may comprise one or more outputs, such as one or more receiver outputs to one or more receivers of a hearing protection device. The output 42 may comprise a first output 43 to the first hearing protection device 2A and/or a second output 45 to the second hearing protection device 2B. The first output 43 may comprise a first primary output 43A to a first receiver 7A of the first hearing protection device 2A. The first output 43 may comprise a first secondary output 43B to a second receiver 8A of the first hearing protection device 2A. The second output 45 may comprise a second primary output 46A to a first receiver 7B of the second hearing protection device 2B. The second output 45 may comprise a second secondary output 46B to a second receiver 8B of the second hearing protection device 2B.

The first receiver 7A transforms the first primary output 43A to first primary audio output 44A that is presented to the user, and the second receiver 8A transforms the first secondary output 43B to first secondary audio output 44B that is presented to the user.

The first receiver 7B transforms the second primary output 46A to second primary audio output 48A that is presented to the user, and the second receiver 8B transforms the second secondary output 46B to second secondary audio output 48B that is presented to the user.

The first receiver 7A may be comprised in a first ear protector 9A, such as a first earpiece or a first earmuff, of the first hearing protection device 2A, the first ear protector 9A comprising a first connection 10A, such as a left connection. The second receiver 8A may be comprised in a second ear protector 11A, such as a second earpiece or a second earmuff, of the first hearing protection device 2A, the second ear protector 11A comprising a second connection 12A, such as a right connection. The first primary audio output 44A may be output by the first receiver 7A and/or the first secondary audio output 44B may be output by the second receiver 8A.

The first receiver 7B may be comprised in a first ear protector 9B, such as a first earpiece or a first earmuff, of the second hearing protection device 2B, the first earpiece 9B comprising a first connection 10B, such as a left connection. The second receiver 8B may be comprised in a second ear protector 11B, such as a second earpiece or a second earmuff, of the second hearing protection device 2B, the second earpiece 11B comprising a second connection 12B, such as a right connection. The second primary audio output 48A may be output by the first receiver 7B and/or the second secondary audio output 48B may be output by the second receiver 8B.

In one or more exemplary communication devices, the communication device 4 is configured to encode (for example by using an encoder, such as an audio encoder, and/or encrypting) the input 23 from the hearing protection device, 2A, 2B for provision of a radio output 26 to the radio unit 6 via the radio interface 16.

In one or more exemplary communication devices, the communication device 4 is configured to decode (for example by using a decoder, such as an audio decoder, and/or decrypting) the radio input 25 from the radio unit 6 for provision of the output 42 (such as the first output 43 and/or the second output 45, e.g., the first primary output 43A, the fist secondary output 43B, the second primary output 46A, and/or the second secondary output 46B) via the interface 20, such as the first hearing protection device interface 40A and/or the second hearing protection device interface 41A.

In one or more exemplary communication devices, to obtain the input 23 comprises to obtain the first input 29 from the first hearing protection device 2A, such as to obtain the first primary input 29A from the first microphone 28A of the first hearing protection device 2A and/or to obtain the first secondary input 29B from the second microphone 30A of the first hearing protection device 2A, via the interface 20, such as the first hearing protection device interface 40A. The first primary input 29A may be generated at the first microphone 28A and the first secondary input 29B may be generated at the second microphone 30A of the first hearing protection device 2A, based e.g. on an audio input from the user (such as speech and/or surrounding noise).

In one or more exemplary communication devices, to obtain the input 23 comprises to obtain the second input 31 from the second hearing protection device 2B, such as to obtain the second primary input 31A from the first microphone 28B of the second hearing protection device 2B and/or to obtain the second secondary input 31B from the second microphone 30B of the second hearing protection device 2B, via the interface 20, such as the second hearing protection device interface 41A. The second primary input 31A may be generated at the first microphone 28B and the second secondary input 31B may be generated at the second microphone 30B of the second hearing protection device 2B, based e.g. on an audio input from the user (such as speech and/or surrounding audio, e.g., surrounding noise).

In one or more exemplary communication devices, the communication device 4 is configured to determine, such as using the processing unit 14 and/or the interface 20, a communication scheme between the communication device 4 and one or more of the first hearing protection device interface 40A and the second hearing protection device interface 41A based on the connection scheme. In other words, the communication device 4 may be configured to determine a communication scheme between the communication device 4 and one or more of the first hearing protection device interface 40A and the second hearing protection device interface 41A based on one or more hearing protection devices connected to the communication device 4.

In one or more exemplary communication devices, to determine, such as using the processing unit and/or the interface, a communication scheme comprises to determine an output scheme comprising a first output 43 to one or more first output terminals of the first connector 40C and/or a second output 45 to one or more second output terminals of the second connector 41C. In other words, the processing unit 14 may be configured to transmit, such as using the processing unit 14 and/or via the interface 20, the first output 43 to the hearing protection device connected to the first connector 40C via the interface 20, such as via the first hearing protection device interface 40A. In other words, the processing unit 14 is configured to transmit, such as using the processing unit 14 and/or the interface 20, the second output 45 to the hearing protection device connected to the second connector 41C via the interface 20, such as via the second hearing protection device interface 41A.

In one or more exemplary communication devices, the communication device 4 is configured to select a first output scheme and determine the first output 43 based on the hearing protection device connected to the first hearing protection device interface 40A, such as connected to the first connector 40C and/or based on the hearing protection device connected to the second hearing protection device interface 41A, such as connected to the second connector 41C.

In one or more exemplary communication devices, the communication device 4 is configured to select a second output scheme and determine the second output 45 based on the hearing protection device connected to the first hearing protection device interface 40A, such as connected to the first connector 40C and/or based on the hearing protection device connected to the second hearing protection device interface 41A, such as connected to the second connector 41C.

In one or more exemplary communication devices, the output scheme, such as the first output scheme and/or the second output scheme, may be indicative of a prioritization of which of the one or more first output terminals and/or the one or more second output terminals the communication device 4 should output the first output 43 and/or the second output 45 to. In other words, to determine the output scheme may comprise to determine which of the one or more hearing protection devices are active and/or inactive, such as active and/or inactive for communication and/or active and/or inactive for a hearing protection function of a user.

In one or more exemplary communication devices, to determine a communication scheme comprises to determine an input scheme comprising a first input 29 to one or more first input terminals of the first connector 40C and/or a second input 31 to one or more second input terminals of the second connector 41C. In other words, the processing unit 14 may be configured to transmit and/or receive, such as using the processing unit 14 and/or the interface 20, the first input 29 to and/or from the hearing protection device connected to the first connector 40C via the interface 20, such as via the first hearing protection device interface 40A. In other words, the processing unit 14 is configured to transmit and/or receive, such as using the processing unit 14 and/or the interface 20, the second input 31 to and/or from the hearing protection device connected to the second connector 41C via the interface 20, such as via the second hearing protection device interface 41A. The first input 29 may be received from one or more microphones of the hearing protection device, such as the first hearing protection device 2A. In other words, the first input 29 may comprise a first microphone input signal (also denoted first primary input 29A) and/or a second microphone input signal (also denoted first secondary input 29B) from respective first microphone 28A and second microphone 30A. For example, the first input 29 may comprise 2, 3, 4, 5, 10 microphone input signals from respectively 2, 3, 4, 5, 10 different microphones of the hearing protection device.

The first input 29 may be representative of one or more of a sound e.g. a voice of the user wearing the hearing protection device, the sound from a vehicle, a weapon, or a teammate, a direction e.g. the direction from where a sound comes from and/or of where a position of interest is (e.g. an enemy territory), a distance to a sound or a position of interest, and/or a relative direction such as an angle indicating a range or radius of where a sound comes from or of where a position of interest is.

In one or more exemplary communication devices, the processing unit 14 comprises an input module for determining an input signal (such as the first input signal 24 and/or the second input signal 32) based on the communication scheme and/or the connection scheme. In other words, the processing unit 14 may be configured to mix one or more signals (such as audio signals) from one or more hearing protection devices, such as from one or more microphones of the one or more hearing protection devices, based on the communication scheme. The processing unit 14 may be configured to mix one or more signals from the first hearing protection device 2A and/or from the second hearing protection device 2B based on the communication scheme and/or the connection scheme. The input signal (such as the first input signal 24 and/or the second input signal 32) may be determined based on the connection scheme and/or the communication scheme.

In one or more exemplary communication devices, the processing unit 14 comprises an output module for determining an output signal (such as a first output signal 47 and/or a second input signal 49) based on the communication scheme and/or the connection scheme. In other words, the processing unit 14 may be configured to mix one or more signals (such as audio signals) to the one or more hearing protection devices, such as to one or more receivers of the one or more hearing protection devices, based on the communication scheme and/or the connection scheme. The processing unit 14 may be configured to mix one or more signals to the first hearing protection device 2A and/or to the second hearing protection device 2B based on the communication scheme and/or the connection scheme. The output signal may be determined based on the connection scheme and/or the communication scheme.

In one or more exemplary communication devices, the communication device 4 is configured to detect a connection of a hearing protection device to the first connector 40C. In other words, the communication device 4 is configured to detect a connection of a hearing protection device, such as the first hearing protection device 2A and/or the second hearing protection device 2B, by the user of the communication device 4 to the first connector 40C.

In one or more exemplary communication devices, the communication scheme is based on a detection of the connection of the hearing protection device to the first connector 40C. In other words, the connection scheme may indicate that a hearing protection device is connected to the first connector 40C and the communication scheme may be based on the connection scheme.

In one or more exemplary communication devices, the communication device 4 is configured to detect a connection of a hearing protection device to the second connector 410. In other words, the communication device 4 is configured to detect a connection of a hearing protection device, such as the first hearing protection device 2A and/or a second hearing protection device 2B, by the user of the communication device 4 to the second connector 41C.

In one or more exemplary communication devices, the communication scheme is based on a detection of the connection of the hearing protection device to the second connector 41C. In other words, the connection scheme may indicate that a hearing protection device is connected to the second connector 41C and the communication scheme may be based on the connection scheme.

In one or more exemplary communication devices, the communication device is configured to detect a first type of the hearing protection device connected to the first connector 40C and/or the second connector 41C.

In one or more exemplary communication devices, the communication scheme is based on the first type.

In one or more exemplary communication devices, the communication device 4 is configured to detect a second type of the hearing protection device connected to the second connector 41C and/or the first connector 40C.

In one or more exemplary communication devices, the communication scheme is based on the second type.

Figure 2:
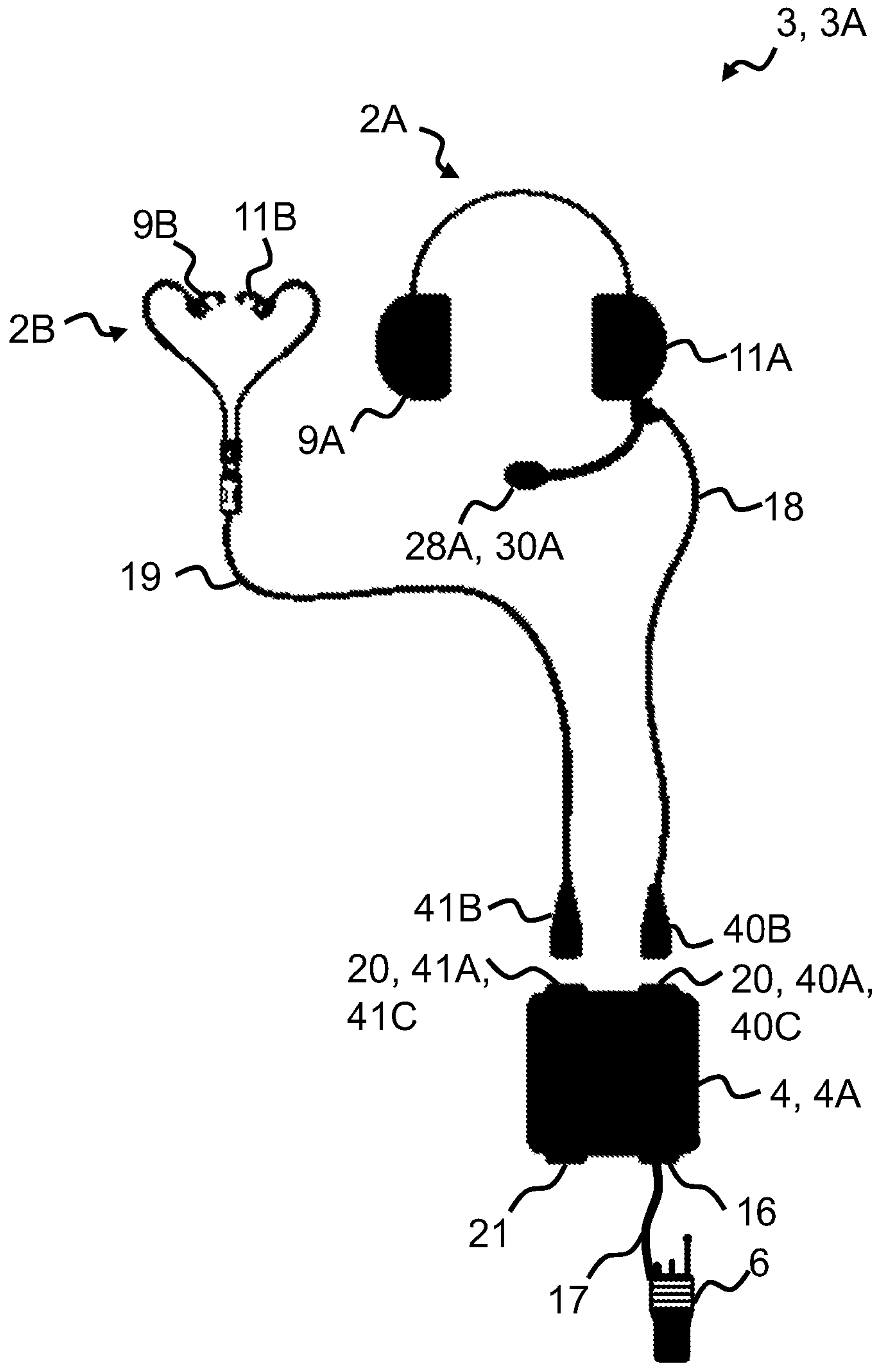

FIG. 2 schematically illustrates an exemplary hearing protection system 3A, such as hearing protection system 3 of FIG. 1, comprising an exemplary communication device 4A according to the disclosure, such as communication device 4 of FIG. 1. The hearing protection system 3A is a dual hearing protection system comprising a first hearing protection device 2A and a second hearing protection device 2B. The communication device 4A comprises a radio connector 16 for connecting a radio unit 6, e.g., via a cable 17. The communication device 4A comprises an interface 20 comprising a first hearing protection device interface 40A comprising a first connector 40C for connection of a hearing protection device, such as the first hearing protection device 2A. The first hearing protection device 2A may be connected to the first connector 40C via a first cable 18. The interface 20 comprises a second hearing protection device interface 41A comprising a second connector 41C for connection of a hearing protection device, such as the second hearing protection device 2B. The second hearing protection device 2B may be connected to the second connector 41C via a second cable 19. The first connector 40C and the second connector 41C are of the same connector type. The first hearing protection device 2A and the second hearing protection device 2B may therefore be connected to any of the first connector 40C and the second connector 41C. The first hearing protection device 2A comprises a first communication device interface 40B, such as comprising a communication device connector configured to be connected to a connector (such as connected to any of the first connector 40C and/or the second connector 41C) of the communication device 4. The second hearing protection device 2B comprises a second communication device interface 41B, such as comprising a communication device connector configured to be connected to a connector (such as connected to any of the first connector 40C and/or the second connector 41C) of the communication device 4.

Optionally, the communication device 4A comprises an accessory interface 21 for connecting an accessory device.

The first hearing protection device 2A comprises a first ear protector 9A and a second ear protector 11A. The first hearing protection device 2A is of the type over-the-ear, OTE, hearing protection device. In other words, the first ear protector 9A and the second ear protector 11A are over-the-ear ear protectors. The communication device 4A may be configured to detect a connection of the first hearing protection device 2A being an over-the-ear, OTE, hearing protection device.

In one or more exemplary communication devices, the communication scheme is based on the detection of the connection with the over-the-ear hearing protection device 2A. In other words, the communication device 4A may be configured to determine an over-the-ear communication scheme. The first hearing protection device 2A comprises a microphone, such as a first microphone 28A and/or a second microphone 30A. The first microphone 28A and/or second microphone 30A may be a mouth microphone configured to be positioned in front of a mouth of a user when using the hearing protection device.

The second hearing protection device 2B comprises a first ear protector 9B and a second ear protector 11B. The second hearing protection device 2B is of the type in-the-ear, ITE, hearing protection device. In other words, the first ear protector 9B and the second ear protector 11B are in-the-ear ear protectors. The communication device 4A may be configured to detect a connection of the second hearing protection device 2B being an in-the-ear, ITE, hearing protection device. The first ear protector 9B of the second hearing protection device 2B and the second ear protector 11B of the second hearing protection device 2B being an ITE hearing protection device may be configured to be arranged inside (such as covered by) the first ear protector 9A of the first hearing protection device 2A and/or the second ear protector 11A of the first hearing protection device 2A being an OTE hearing protection device.

In one or more exemplary communication devices, the communication scheme is based on the detection of the connection with the in-the-ear hearing protection device 2B. In other words, the communication device 4A may be configured to determine an in-the-ear communication scheme.

In one or more exemplary communication devices, the communication device 4A may upon detection of the first hearing protection device 2A and a second hearing protection device 2B, such as the detection of an OTE hearing protection device and an ITE hearing protection device, be configured to determine a dual hearing protection device communication scheme, such as a dual hearing protection device configuration.

Figure 3:
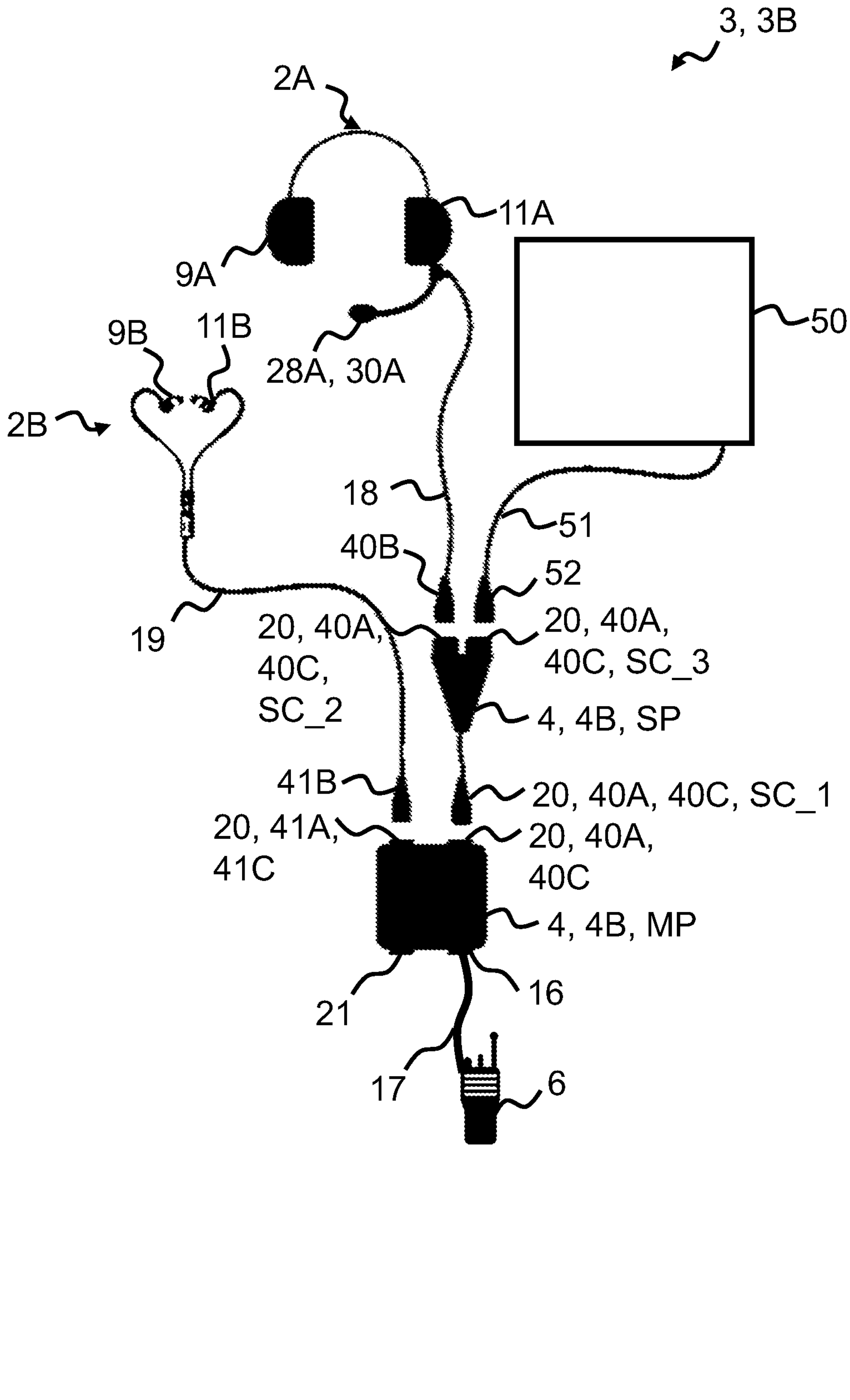

FIG. 3 schematically illustrates an exemplary hearing protection system 3B, such as hearing protection system 3 of FIG. 1, comprising an exemplary communication device 4B according to the disclosure, such as communication device 4 of FIG. 1. The hearing protection system 3B is a dual hearing protection system comprising a first hearing protection device 2A and a second hearing protection device 2B. The communication device 4A comprises a radio connector 16 for connecting a radio unit 6, e.g., via a cable 17.

The communication device 4B may be seen as a two-part communication device. In other words, the communication device 4B may comprise a main part MP and a splitter part SP connected to a first hearing protection device interface 40A of the communication device 4B, such as connected to a first connector 40C of the main part MP. The splitter part SP may be seen as a splitter configured to be connected to a hearing protection device interface of the communication device 4B (such as a connector of the communication device) for providing one or more additional hearing protection device interfaces to the communication device 4B, such as for providing one or more additional connectors to the communication device.

In other words, the communication device 4B may comprise an interface 20 comprising a main part interface and a splitter part interface. In other words, the main part MP may comprise the first connector 40C for connecting the splitter part SP. The splitter part SP may comprise a first splitter connector SC_1 on one side of the splitter part SP configured to be connected to a connector of the main part MP, such as the first connector 40C, and two or more connectors, such as a second splitter connector SC_2 and a third splitter connector SC_3, on the other side of the splitter part SP configured to be connected to one or more hearing protection devices and/or accessory devices.

The first hearing protection device 2A may be connected to the communication device 4B via the splitter part SP. The first hearing protection device 2A may be connected to the communication device 4B via the second splitter connector SC_2 and the first splitter connector SC_1, e.g., via a first cable 18 and a first communication device interface 40B.

The second hearing protection device 2B may be connected to the second connector 41C via a second cable 19. The second hearing protection device 2B comprises a second communication device interface 41B, such as comprising a communication device connector configured to be connected to a connector (such as connected to any of the first connector 40C and/or the second connector 41C) of the communication device 4B.

The first connector 40C, the second connector 41C, the second splitter connector SC_2, and/or the third splitter connector SC_3 are of the same connector type. The first hearing protection device 2A and the second hearing protection device 2B may therefore be connected to any of the first connector 40C, the second connector 41C, the second splitter connector SC_2, and/or the third splitter connector SC_3.

Optionally, the communication device 4B comprises an accessory interface 21 for connecting an accessory device.

The communication device 4B may be connected to an accessory device 50 via the interface 20. The accessory device 50 may be connected to the communication device 4B via the splitter part SP. The accessory device 50 may be connected to the communication device 4B via the third splitter connector SC_3 and the first splitter connector SC_1, e.g., via an accessory cable 51 and a third communication device interface 52. The accessory device 50 may be seen as an accessory electronic device, such as a user accessory electronic device.

The first hearing protection device 2A comprises a first ear protector 9A and a second ear protector 11A. The first hearing protection device 2A is of the type over-the-ear, OTE, hearing protection device. In other words, the first ear protector 9A and the second ear protector 11A are over-the-ear ear protectors. The communication device 4B may be configured to detect a connection of the first hearing protection device 2A being an over-the-ear, OTE, hearing protection device.

In one or more exemplary communication devices, the communication scheme is based on the detection of the connection with the over-the-ear hearing protection device 2A. In other words, the communication device 4B may be configured to determine an over-the-ear communication scheme. The first hearing protection device 2A comprises a microphone, such as a first microphone 28A and/or a second microphone 30A. The first microphone 28A and/or second microphone 30A may be a mouth microphone configured to be positioned in front of a mouth of a user when using the hearing protection device.

The second hearing protection device 2B comprises a first ear protector 9B and a second ear protector 11B. The second hearing protection device 2B is of the type in-the-ear, ITE, hearing protection device. In other words, the first ear protector 9B and the second ear protector 11B are in-the-ear ear protectors. The communication device 4B may be configured to detect a connection of the second hearing protection device 2B being an in-the-ear, ITE, hearing protection device.

In one or more exemplary communication devices, the communication scheme is based on the detection of the connection with the in-the-ear hearing protection device 2B. In other words, the communication device 4B may be configured to determine an in-the-ear communication scheme.

In one or more exemplary communication devices, the communication device 4B may upon detection of the first hearing protection device 2A and a second hearing protection device 2B, such as the detection of an OTE hearing protection device and an ITE hearing protection device, be configured to determine a dual hearing protection device communication scheme, such as a dual hearing protection device configuration.

Figure 4:
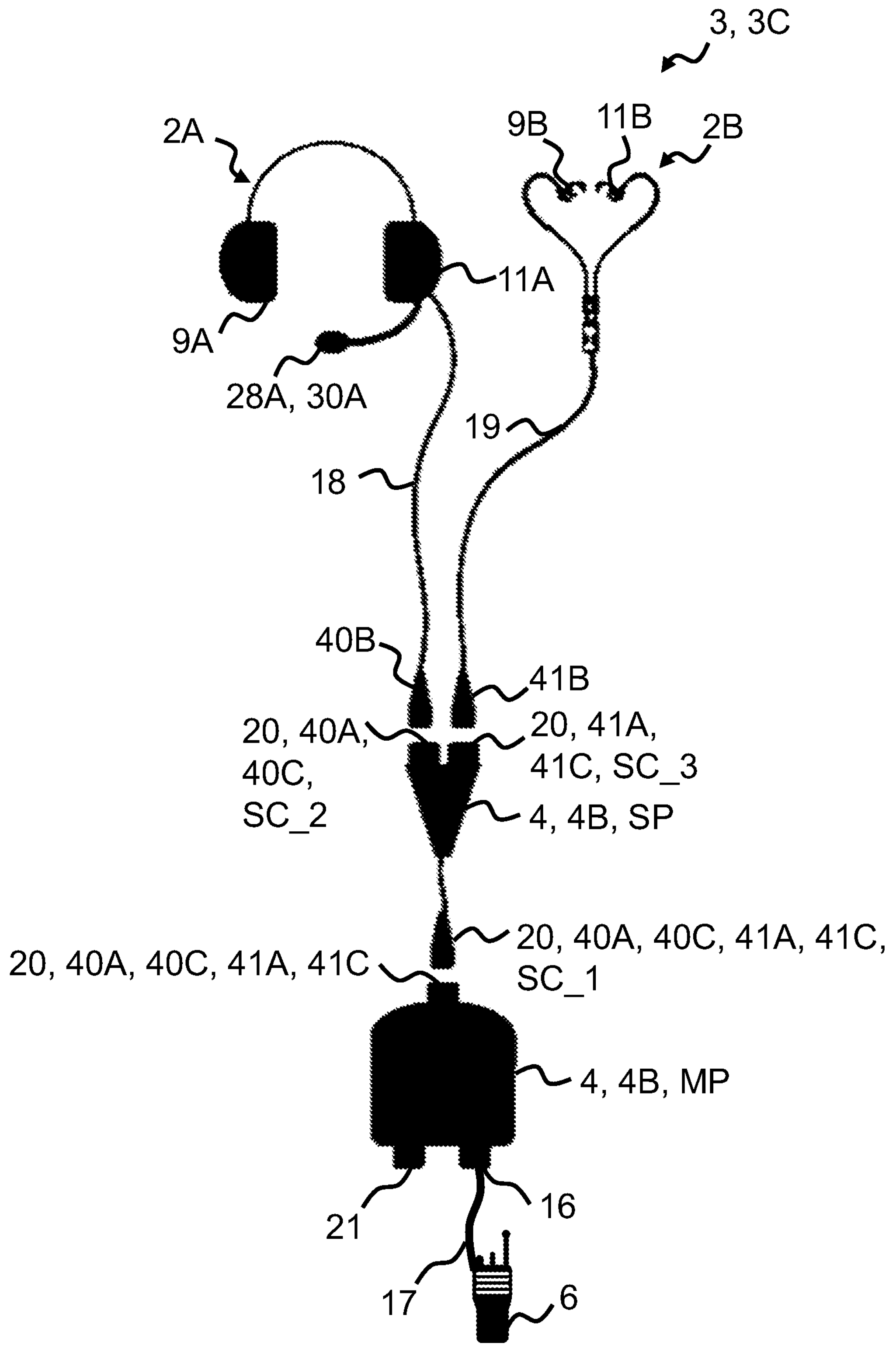

FIG. 4 schematically illustrates an exemplary hearing protection system 3C, such as hearing protection system 3 of FIG. 1, comprising an exemplary communication device 4C according to the disclosure, such as communication device 4 of FIG. 1. The hearing protection system 3C is a dual hearing protection system comprising a first hearing protection device 2A and a second hearing protection device 2B. The communication device 4A comprises a radio connector 16 for connecting a radio unit 6, e.g., via a cable 17.

The communication device 4C may be seen as a two-part communication device. In other words, the communication device 4C may comprise a main part MP and a splitter part SP connected to a first hearing protection device interface 40A of the communication device 4C, such as connected to a first connector 40C of the main part MP. In FIG. 4, the interface 20 of the main part MP of the communication device 4C only comprises one connector 40C, 41C for connecting the splitter part SP to the main part. The splitter part SP may be seen as a splitter configured to be connected to a hearing protection device interface of the communication device 4C (such as a connector of the communication device) for providing one or more additional hearing protection device interfaces to the communication device 4C, such as for providing one or more additional connectors to the communication device.

In other words, the communication device 4C may comprise an interface 20 comprising a main part interface and a splitter part interface. In other words, the main part MP may comprise the first connector 40C for connecting the splitter part SP. The splitter part SP may comprise a first splitter connector SC_1 on one side of the splitter part SP configured to be connected to a connector of the main part MP, such as the first connector 40C, and two or more connectors, such as a second splitter connector SC_2 and a third splitter connector SC_3, on the other side of the splitter part SP configured to be connected to one or more hearing protection devices and/or accessory devices.

The first hearing protection device 2A may be connected to the communication device 4C via the splitter part SP. The first hearing protection device 2A may be connected to the communication device 4C via the second splitter connector SC_2 and the first splitter connector SC_1, e.g., via a first cable 18 and a first communication device interface 40B.

The second hearing protection device 2B may be connected to the communication device 4C via the splitter part SP. The second hearing protection device 2B may be connected to the communication device 4C via the third splitter connector SC_3 and the first splitter connector SC_1, e.g., via a second cable 19 and a second communication device interface 41B.

The first connector 40C, the second splitter connector SC_2, and/or the third splitter connector SC_3 are of the same connector type. The first hearing protection device 2A and the second hearing protection device 2B may therefore be connected to any of the first connector 40C, the second splitter connector SC_2, and/or the third splitter connector SC_3.

Optionally, the communication device 4C comprises an accessory interface 21 for connecting an accessory device.

The first hearing protection device 2A comprises a first ear protector 9A and a second ear protector 11A. The first hearing protection device 2A is of the type over-the-ear, OTE, hearing protection device. In other words, the first ear protector 9A and the second ear protector 11A are over-the-ear ear protectors. The communication device 4C may be configured to detect a connection of the first hearing protection device 2A being an over-the-ear, OTE, hearing protection device.

In one or more exemplary communication devices, the communication scheme is based on the detection of the connection with the over-the-ear hearing protection device 2A. In other words, the communication device 4C may be configured to determine an over-the-ear communication scheme. The first hearing protection device 2A comprises a microphone, such as a first microphone 28A and/or a second microphone 30A. The first microphone 28A and/or second microphone 30A may be a mouth microphone configured to be positioned in front of a mouth of a user when using the hearing protection device.

The second hearing protection device 2B comprises a first ear protector 9B and a second ear protector 11B. The second hearing protection device 2B is of the type in-the-ear, ITE, hearing protection device. In other words, the first ear protector 9B and the second ear protector 11B are in-the-ear ear protectors. The communication device 4C may be configured to detect a connection of the second hearing protection device 2B being an in-the-ear, ITE, hearing protection device.

In one or more exemplary communication devices, the communication scheme is based on the detection of the connection with the in-the-ear hearing protection device 2B. In other words, the communication device 4C may be configured to determine an in-the-ear communication scheme.

In one or more exemplary communication devices, the communication device 4C may upon detection of the first hearing protection device 2A and a second hearing protection device 2B, such as the detection of an OTE hearing protection device and an ITE hearing protection device, be configured to determine a dual hearing protection device communication scheme, such as a dual hearing protection device configuration.

Figure 5:
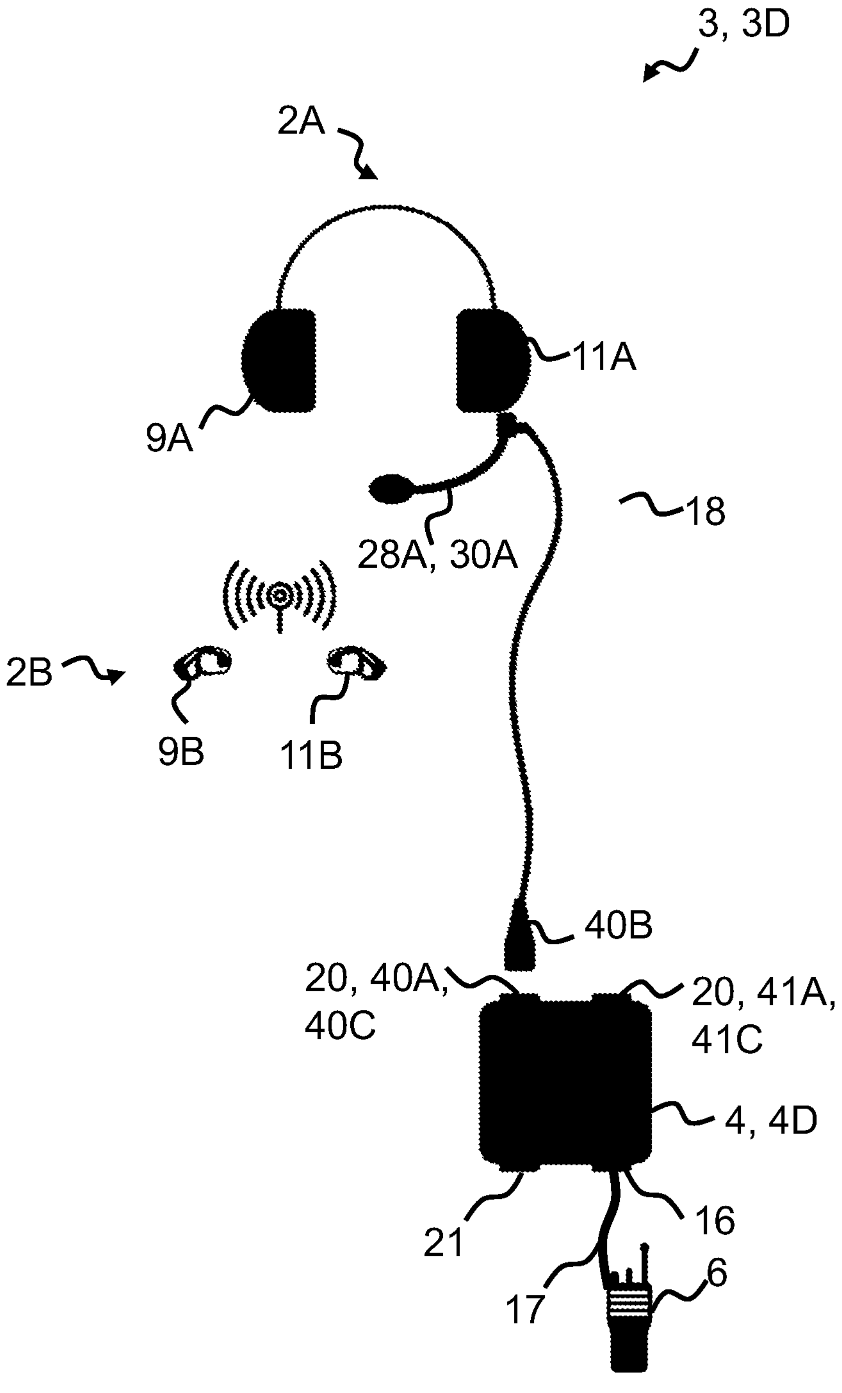

FIG. 5 schematically illustrates an exemplary hearing protection system 3D, such as hearing protection system 3 of FIG. 1, comprising an exemplary communication device 4D according to the disclosure, such as communication device 4 of FIG. 1. The hearing protection system 3D is a dual hearing protection system comprising a first hearing protection device 2A and a second hearing protection device 2B. The communication device 4D comprises a radio connector 16 for connecting a radio unit 6, e.g., via a cable 17. The communication device 4D comprises an interface 20 comprising a first hearing protection device interface 40A comprising a first connector 40C for connection of a hearing protection device, such as the first hearing protection device 2A. The first hearing protection device 2A may be connected to the first connector 40C via a first cable 18.

The communication device 4D may comprise a wireless interface acting as a hearing protection device interface. The communication device 4D may be configured to detect one or more hearing protection devices connected to the communication device 4D via the interface 20, such as via the wireless interface. The second hearing protection device 2B is a wireless hearing protection device configured to connect to the communication device 4D via a wireless connection. The communication device 4D may be configured to determine a connection scheme of the interface 20, such as a connection scheme of the wireless interface where the second hearing protection device 2B is connected wirelessly and/or the first hearing protection device interface 40A where the first hearing protection device 2A is wired connected. The communication device 4 may be configured to determine a communication scheme between the communication device 4 and the one or more hearing protection devices. The communication device 4 may be configured to communicate with the one or more hearing protection devices according to the connection scheme and/or the communication scheme.

The first hearing protection device 2A comprises a first ear protector 9A and a second ear protector 11A. The first hearing protection device 2A is of the type over-the-ear, OTE, hearing protection device. In other words, the first ear protector 9A and the second ear protector 11A are over-the-ear ear protectors. The communication device 4A may be configured to detect a connection of the first hearing protection device 2A being an over-the-ear, OTE, hearing protection device.

In one or more exemplary communication devices, the communication scheme is based on the detection of the connection with the over-the-ear hearing protection device 2A. In other words, the communication device 4A may be configured to determine an over-the-ear communication scheme. The first hearing protection device 2A comprises a microphone, such as a first microphone 28A and/or a second microphone 30A. The first microphone 28A and/or second microphone 30A may be a mouth microphone configured to be positioned in front of a mouth of a user when using the hearing protection device.

The second hearing protection device 2B comprises a first ear protector 9B and a second ear protector 11B. The second hearing protection device 2B is a wireless hearing protection device and the first ear protector 9B and the second ear protector 11B may therefore be wireless ear protectors. The second hearing protection device 2B is of the type wireless in-the-ear, ITE, hearing protection device. In other words, the first ear protector 9B and the second ear protector 11B are in-the-ear ear protectors. The communication device 4D may be configured to detect a connection of the second hearing protection device 2B being a wireless in-the-ear, ITE, hearing protection device. The first ear protector 9B of the second hearing protection device 2B and the second ear protector 11B of the second hearing protection device 2B being an ITE hearing protection device may be configured to be arranged inside (such as covered by) the first ear protector 9A of the first hearing protection device 2A and/or the second ear protector 11A of the first hearing protection device 2A being an OTE hearing protection device.

In one or more exemplary communication devices, the communication scheme is based on the detection of the connection with the wireless in-the-ear hearing protection device 2B. In other words, the communication device 4A may be configured to determine a wireless in-the-ear communication scheme.

Figure 6:
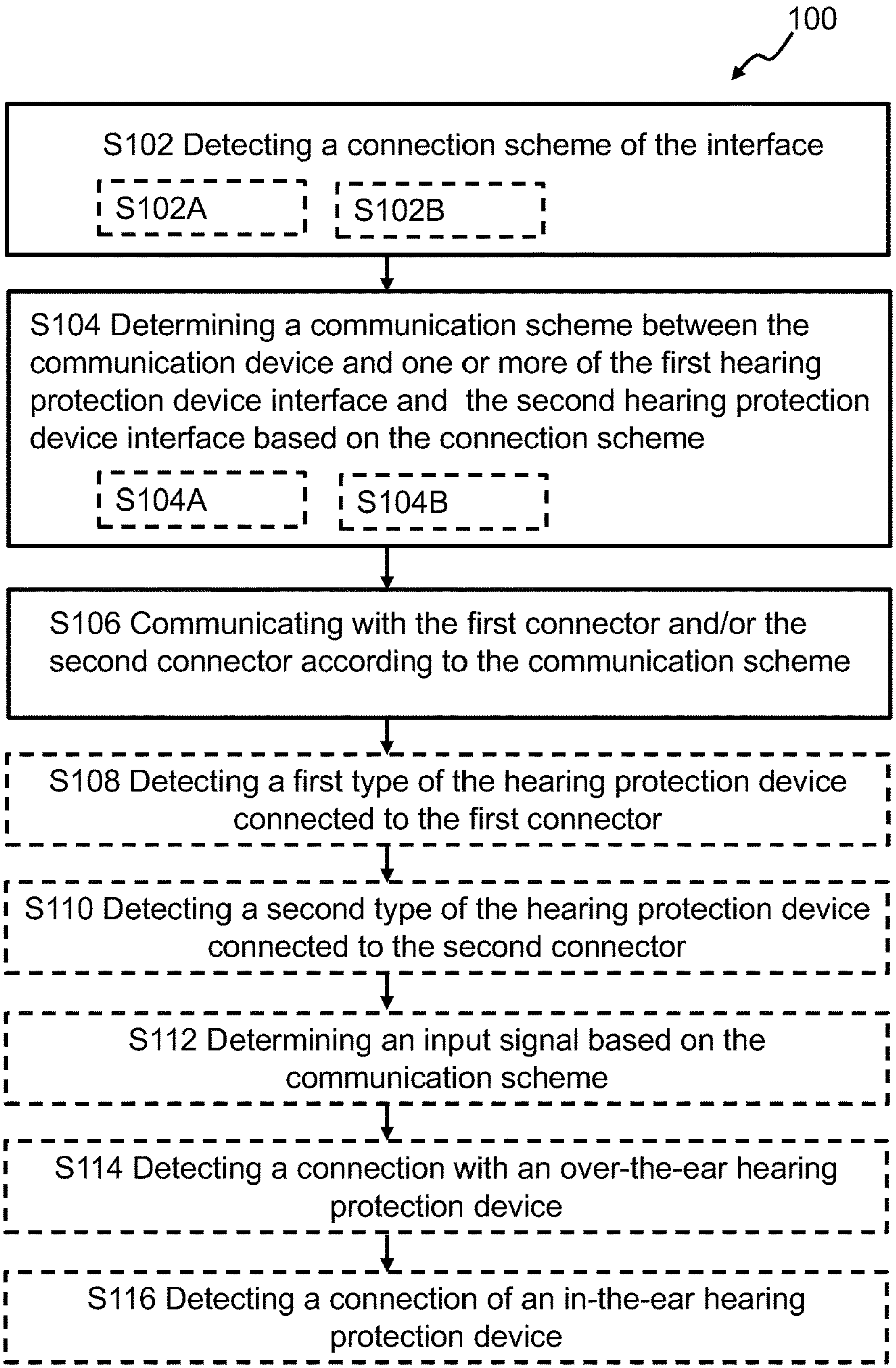
FIG. 6 is a flow diagram of an exemplary method according to the disclosure.

The communication device 4, 4A, 4B, 4C, and/or 4D is optionally configured to perform any of the operations disclosed in FIG. 6 (such as any one or more of S102A, S102B, S104A, S104B, S108, S110, S112, S114, S116). The operations of the communication device may be embodied in the form of executable logic routines (for example, lines of code, software programs, etc.) that are stored on a non-transitory computer readable medium (for example, memory 22) and are executed by the processing unit 14).

Furthermore, the operations of the communication device 4, 4A, 4B, and/or 4C may be considered a method that the communication device 4, 4A, 4B, and/or 4C is configured to carry out. Also, while the described functions and operations may be implemented in software, such functionality may as well be carried out via dedicated hardware or firmware, or some combination of hardware, firmware and/or software.

FIG. 6 shows a flow diagram of an exemplary method. A method 100 is disclosed, such as a method for operating a communication device for a hearing protection system comprising one or more hearing protection devices according to the disclosure, such as the communication device of FIG. 1, FIG. 2, FIG. 3, FIG. 4, and/or FIG. 5. The method 100 may be performed by the communication device, such as the communication device of FIG. 1, FIG. 2, FIG. 3, FIG. 4, and/or FIG. 5. The communication device comprises a processing unit, a memory, and an interface comprising a first hearing protection device interface comprising a first connector for connection of a hearing protection device and a second hearing protection device interface comprising a second connector for connection of a hearing protection device, wherein the first connector and the second connector are of the same connector type.

The method comprises detecting S102 a connection scheme of the interface.

The method comprises determining S104 a communication scheme between the communication device and one or more of the first hearing protection device interface and the second hearing protection device interface based on the connection scheme.

The method comprises communicating S106 with the first connector and/or the second connector according to the communication scheme.

In one or more exemplary methods, the method 100 comprises detecting S108 a first type of the hearing protection device connected to the first connector.

In one or more exemplary methods, the determination S104 of the communication scheme is based on the first type.

In one or more exemplary methods, the method 100 comprises detecting S110 a second type of the hearing protection device connected to the second connector.

In one or more exemplary methods, the determination S104 of the communication scheme is based on the second type.

In one or more exemplary methods, the detection S102 of the connection scheme comprises detecting S102A an active or inactive state of the hearing protection device connected to the first connector.

In one or more exemplary methods, the detection S102 of the connection scheme comprises detecting S102B an active or inactive state of the hearing protection device connected to the second connector.

In one or more exemplary methods, the determination S104 of the communication scheme comprises determining S104A an output scheme comprising a first output to one or more first output terminals of the first connector and/or a second output to one or more second output terminals of the second connector.

In one or more exemplary methods, the determination S104 of the communication scheme comprises determining S104B an input scheme comprising a first input to one or more first input terminals of the first connector and/or a second input to one or more second input terminals of the second connector.

In one or more exemplary methods, the method 100 comprises determining S112 an input signal based on the communication scheme.

In one or more exemplary methods, the method 100 comprises detecting S114 a connection with an over-the-ear hearing protection device.

In one or more exemplary methods, the determination S104 of the communication scheme is based on the detection S114 of the connection with the over-the-ear hearing protection device.

In one or more exemplary methods, the method 100 comprises detecting S116 a connection of an in-the-ear hearing protection device.

In one or more exemplary methods, the determination S104 of the communication scheme is based on the detection S116 of the connection with the in-the-ear hearing protection device.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa. It may be appreciated that the Figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example communication devices, methods, and/or server devices which may be comprised in, or a part of, or are further modules or operations which may be taken in addition to the modules or operations of the solid line example communication devices and/or methods. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary communication devices, methods, and/or server devices may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

1 network
2 hearing protection device
2A first hearing protection device
2B second hearing protection device
3, 3A, 3B, 3C, 3D hearing protection system
4, 4A, 4B, 4C, 4D communication device
5 communication system

6 radio unit
7A, 7B first receiver
8A, 8B second receiver
9A, 9B first ear protector, first earpiece, first earmuff
10A, 10B first connection
11A, 11B second ear protector, second earpiece, second earmuff
12A, 12B second connection
13 hearing protection apparatus
14 processing unit
16 radio interface
17 cable
18 first cable
19 second cable
20 interface
21 accessory interface
22 memory
23 input
24 first input signal
25 radio input
26 radio output
28A, 28B first microphone
29 first input
29A first primary input
29B first secondary input
30A, 30B second microphone
31 second input
31A second primary input
31B second secondary input
32 second input signal
40A first hearing protection device interface
41A second hearing protection device interface
40B first communication device interface
41B second communication device interface
42 output
43 first output
43A first primary output
43B first secondary output
44A first primary audio output
44B first secondary audio output
45 second output
46A second primary output
46B second secondary output
47 first output signal
48A second primary audio output
48B second secondary audio output
49 second output signal
50 accessory device
51 accessory cable
52 third communication device interface
MP main part
SP splitter part
SC_1 first splitter connector
SC_2 second splitter connector
SC_3 third splitter connector
PTT_1 first push-to-talk interface, first push-to-talk button
PTT_2 second push-to-talk interface, second push-to-talk button
100 method for operating a communication device for a hearing protection system
S102 detecting a connection scheme of the interface
S102A detecting an active or inactive state of the hearing protection device connected to the first connector
S102B detecting an active or inactive state of the hearing protection device connected to the second connector
S104 determining a communication scheme between the communication device and one or more of the first hearing protection device interface and the second hearing protection device interface based on the connection scheme
S104A determining an output scheme comprising a first output to one or more first output terminals of the first connector and/or a second output to one or more second output terminals of the second connector
S104B determining an input scheme comprising a first input to one or more first input terminals of the first connector and/or a second input to one or more second input terminals of the second connector
S106 communicating with the first connector and/or the second connector according to the communication scheme
S108 detecting a first type of the hearing protection device connected to the first connector
S110 detecting a second type of the hearing protection device connected to the second connector
S112 determining an input signal based on the communication scheme
S114 detecting a connection with an over-the-ear hearing protection device
S116 detecting a connection of an in-the-ear hearing protection device

The invention claimed is:

1. A communication device for a hearing protection system, the hearing protection system comprising one or more hearing protection devices, the one or more hearing protection devices comprise a first hearing protection device, the communication device comprising:
- a processing unit;
- a memory; and
- an interface comprising:
  - a first hearing protection device interface comprising a first connector; and
  - a second hearing protection device interface comprising a second connector;
- wherein each of the first connector and the second connector is selectable for connection with the first hearing protection device; and
- wherein the first connector and the second connector are identical connectors of the communication device, and wherein the communication device is configured to support multiple functions of the first hearing protection device regardless of whether the first hearing protection device is connected to the first connector or the second connector of the communication device.

2. The communication device according to claim 1, wherein the communication device is configured to detect a connection scheme of the interface.

3. The communication device according to claim 2, wherein the communication device is configured to determine a communication scheme for one or more of the first hearing protection device interface and the second hearing protection device interface based on the connection scheme.

4. The communication device according to claim 3, wherein the communication device is configured to detect a connection of the first hearing protection device to the first connector, and wherein the communication scheme is based on a detection of the connection of the first hearing protection device to the first connector.

5. The communication device according to claim 3, wherein the communication device is configured to detect a connection of the first hearing protection device or a second hearing protection device to the second connector, and wherein the communication scheme is based on a detection of the connection of the first hearing protection device or the second hearing protection device to the second connector.

6. The communication device according to claim 3, wherein the communication device is configured to detect a first type of the first hearing protection device when the first hearing protection device is connected to the first connector, and wherein the communication scheme is based on the first type.

7. The communication device according to claim 6, wherein the communication device is configured to detect a second type of a second hearing protection device when the second hearing protection device is connected to the first connector, and wherein the communication scheme is based on the second type.

8. The communication device according to claim 6, wherein the communication device is configured to detect a second type of a second hearing protection device when the second hearing protection device is connected to the second connector, and wherein the communication scheme is based on the second type.

9. The communication device according to claim 3, wherein the communication device is configured to detect the connection scheme by detecting an active or inactive state of the first hearing protection device when the first hearing protection device is connected to the first connector, and wherein the communication scheme is based on the detected active or inactive state of the first hearing protection device when the first hearing protection device is connected to the first connector.

10. The communication device according to claim 3, wherein the communication device is configured to detect the connection scheme by detecting an active or inactive state of: the first hearing protection device when the first hearing protection device is connected to the second connector, or a second hearing protection device when the second hearing protection device is connected to the second connector, and wherein the communication scheme is based on the detected active or inactive state.

11. The communication device according to claim 3, wherein the communication device is configured to determine the communication scheme by determining an output scheme comprising a first output for one or more first output terminals of the first connector and/or a second output for one or more second output terminals of the second connector.

12. The communication device according to claim 3, wherein the communication device is configured to determine the communication scheme by determining an input scheme comprising a first input for one or more first input terminals of the first connector and/or a second input for one or more second input terminals of the second connector.

13. The communication device according to claim 3, wherein the processing unit comprises an input module for determining an input signal based on the communication scheme.

14. The communication device according to claim 3, wherein the first hearing protection device comprises an over-the-ear hearing protection device, wherein the communication device is configured to detect the connection with the over-the-ear hearing protection device, and wherein the communication scheme is based on the detection of the connection with the over-the-ear hearing protection device.

15. The communication device according to claim 3, wherein the first hearing protection device comprises an in-the-ear hearing protection device, wherein the communication device is configured to detect the connection of the in-the-ear hearing protection device, and wherein the communication scheme is based on the detection of the connection with the in-the-ear hearing protection device.

16. The communication device according to claim 1, wherein the interface comprises a first push-to-talk interface, PTT_1, and/or a second push-to-talk interface PTT_2.

17. The communication device according to claim 1, wherein the interface comprises a wireless interface, and wherein the communication device is configured to communicate with the one or more hearing protection devices via the wireless interface.

18. The communication device according to claim 1, wherein the one or more hearing protection devices comprise a second hearing protection device, and wherein each of the first connector and the second connector is selectable for connection with the second hearing protection device.

19. The communication device according to claim 1, wherein the communication device is configured to support microphone function and speaker function of the first hearing protection device regardless of whether the first hearing protection device is connected to the first connector or the second connector of the communication device.

20. A method performed by a communication device for a hearing protection system, the hearing protection system comprising one or more hearing protection devices, the one or more hearing protection devices comprise a first hearing protection device, the communication device comprising a processing unit, a memory, and an interface comprising a first hearing protection device interface comprising a first connector and a second hearing protection device interface comprising a second connector, wherein each of the first connector and the second connector is selectable for connection with the first hearing protection device, and wherein the communication device is configured to support multiple functions of the first hearing protection device regardless of whether the first hearing protection device is connected to the communication device via either one of the identical connectors, the method comprising:

detecting a connection scheme of the interface;

determining a communication scheme for one or more of the first hearing protection device interface and the second hearing protection device interface; and communicating with the first connector and/or the second connector according to the communication scheme.

21. The method according to claim 20, wherein the communication device is configured to support microphone function and speaker function of the first hearing protection device regardless of whether the first hearing protection device is connected to the first connector or the second connector of the communication device.

22. A communication device for a hearing protection system, the hearing protection system comprising one or more hearing protection devices, the one or more hearing protection devices comprise a first hearing protection device, the communication device comprising:

a processing unit;

a memory; and an interface comprising:

a first communication interface; and a second communication interface;

wherein each of the first communication interface and the second communication interface is selectable for communicative connection with the first hearing protection device; and wherein the communication device is configured to support microphone function and speaker function of the first hearing protection device regardless of whether the first hearing protection device is communicatively connected to the first communication interface or the second communication interface of the communication device.

23. The communication device according to claim 22, wherein the communication device is configured to detect a connection scheme of the interface.

24. The communication device according to claim 23, wherein the communication device is configured to determine a communication scheme for one or more of the first communication interface and the second communication interface based on the connection scheme.

25. The communication device according to claim 24, wherein the communication device is configured to detect a first type of the first hearing protection device when the first hearing protection device is communicatively connected to the first communication interface, and wherein the communication scheme is based on the first type.

26. The communication device according to claim 25, wherein the communication device is configured to detect a second type of a second hearing protection device when the second hearing protection device is communicatively connected to the first communication interface, and wherein the communication scheme is based on the second type.

27. The communication device according to claim 25, wherein the communication device is configured to detect a second type of a second hearing protection device when the second hearing protection device is communicatively connected to the second communication interface, and wherein the communication scheme is based on the second type.

28. The communication device according to claim 24, wherein the communication device is configured to determine the communication scheme by determining an output scheme and/or an input scheme.

29. The communication device according to claim 22, wherein the interface comprises a first push-to-talk interface, PTT_1, and/or a second push-to-talk interface PTT_2.

30. The communication device according to claim 22, wherein the one or more hearing protection devices comprise a second hearing protection device, and wherein each of the first communication interface and the second communication interface is selectable for communicative connection with the second hearing protection device.

* * * * *